(12) United States Patent
Nakagawa et al.

(10) Patent No.: US 8,090,398 B2
(45) Date of Patent: Jan. 3, 2012

(54) TERMINAL APPARATUS

(75) Inventors: Tetsuya Nakagawa, Koganei (JP); Yuji Hatano, Arlington, VA (US); Yasuhiro Sagesaka, Kodaira (JP); Toru Baji, Inagi (JP); Koki Noguchi, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 757 days.

(21) Appl. No.: 12/112,968

(22) Filed: Apr. 30, 2008

(65) Prior Publication Data

US 2008/0207158 A1    Aug. 28, 2008

Related U.S. Application Data

(63) Continuation of application No. 11/289,389, filed on Nov. 30, 2005, now abandoned, which is a continuation of application No. 10/639,445, filed on Aug. 13, 2003, now Pat. No. 6,993,597, which is a continuation of application No. 10/028,425, filed on Dec. 28, 2001, now Pat. No. 6,643,713, which is a continuation of application No. 09/051,286, filed as application No. PCT/JP96/02910 on Oct. 7, 1996, now Pat. No. 6,353,863.

(30) Foreign Application Priority Data

Oct. 9, 1995 (JP) .................................. 07-261177

(51) Int. Cl.
*H04M 1/00* (2006.01)
(52) U.S. Cl. ........ 455/550.1; 455/557; 455/84; 712/235
(58) Field of Classification Search ............... 455/550.1, 455/557, 84; 712/35, 235
See application file for complete search history.

(56) References Cited

U.S. PATENT DOCUMENTS

| | | | |
|---|---|---|---|
| 4,779,192 | A | 10/1988 | Torii et al. |
| 4,791,590 | A | 12/1988 | Ku et al. |
| 5,203,003 | A | 4/1993 | Donner |

(Continued)

FOREIGN PATENT DOCUMENTS

EP    0442041    8/1991
(Continued)

OTHER PUBLICATIONS

"DSP56116 Digital Signal Processor User User's Manual" issued by Motorola Inc., pp. 1-1 to 5-16, 1990.

(Continued)

*Primary Examiner* — Christian Hannon
(74) *Attorney, Agent, or Firm* — Antonelli, Terry, Stout & Kraus, LLP.

(57) ABSTRACT

A low cost, a low power consumption and a small size are three very important factors for a mobile communication terminal. A great problem is posed by the conventional technique using a DSP and a CPU independent of each other which requires two external memory systems. Also, two peripheral units are required for data input and output of the DSP and CPU. As a result, an extraneous communication overhead occurs between the DSP and the CPU. The invention realizes a mobile communication terminal system by a DSP/CPU integrated chip comprising a DSP/CPU core (500) integrated as a single bus master, an integrated external bus interface (606) and an integrated peripheral circuit interface. The memory systems and the peripheral circuits of the DSP and the CPU can thus be integrated to realize a mobile communication terminal system low in cost and power consumption and small in size.

16 Claims, 26 Drawing Sheets

U.S. PATENT DOCUMENTS

| | | |
|---|---|---|
| 5,293,586 A | 3/1994 | Yamazaki et al. |
| 5,311,458 A | 5/1994 | Covey et al. |
| 5,315,700 A | 5/1994 | Johnston et al. |
| 5,392,448 A | 2/1995 | Frankel et al. |
| 5,491,828 A | 2/1996 | Afek et al. |
| 5,519,879 A | 5/1996 | Carmon |
| 5,567,900 A | 10/1996 | Higashi |
| 5,592,677 A | 1/1997 | Intrater et al. |
| 5,630,153 A | 5/1997 | Intrater et al. |
| 5,681,220 A * | 10/1997 | Bertram et al. .................. 463/37 |
| 5,768,613 A | 6/1998 | Asghar |
| 5,794,067 A | 8/1998 | Kadowaki |
| 5,867,726 A | 2/1999 | Ohsuga et al. |
| 5,884,092 A | 3/1999 | Kiuchi et al. |
| 6,047,358 A | 4/2000 | Jacobs |
| 6,088,783 A | 7/2000 | Morton |
| 6,112,290 A * | 8/2000 | Nonami ........................... 712/35 |
| 6,230,255 B1 | 5/2001 | Asghar et al. |
| 6,353,863 B1 | 3/2002 | Nakagawa et al. |
| 6,574,724 B1 | 6/2003 | Hoyle |
| 6,711,602 B1 | 3/2004 | Bhandal |
| 6,748,457 B2 | 6/2004 | Fallon |
| 2002/0019841 A1 | 2/2002 | Kiuchi |
| 2004/0162944 A1 | 8/2004 | Kim |

FOREIGN PATENT DOCUMENTS

| | | |
|---|---|---|
| EP | 0465054 | 1/1992 |
| JP | 60204029 | 10/1985 |
| JP | 61150061 | 7/1986 |
| JP | 2297594 | 12/1990 |
| JP | 3080689 | 8/1991 |
| JP | 4167168 | 6/1992 |
| JP | 4219045 | 8/1992 |
| JP | 581219 | 4/1993 |
| JP | 5128280 | 5/1993 |
| JP | 407013561 | 1/1995 |
| JP | 738509 | 2/1995 |
| JP | 784963 | 3/1995 |
| JP | 00922379 | 1/1997 |
| WO | 9714093 | 4/1997 |

OTHER PUBLICATIONS

Nikkei Electronics vol. 463, Dec. 26, 1998 (Nikkei BP Corp.), Osamu Kobayashi and other, "DSP which spreads its application scope on the full-scale debut of 32-bit floating points" pp. 133-146, Figs. 5, 12.

"Latest Information on GSM/Systems, Terminals and Services", Seminar materials, Japan Industrial Technological Center, May 18 and 19, 1965 and "Development Trend of GSM telephone Terminal Devices", pp. 118-130, Japan Phillips.

"Hitachi Single-Chip RISC Microcomputers SH7032, SH7034 Hardware Manual", third edition, Mar. 1964, issued by Hitachi, Ltd.

"A diversified application study for memory IC" Interface No. 123, Aug. 1987 (CQ Publishing).

"Super RISC Engine SH7604 Hardware Manual", First Edition, Sep. 1994, issued by Hitachi, Ltd.

W. Patrick Hays, "A Programmable Digital Signal Processor with 32b Floating Point Arithmetic", 1985 IEEE International Solid-State Circuits Conference Digest of Technical Papers, pp. 92-93, 318.

R. Meyer, et al., Convolution Algorithms on DSP Processors, 1991, pp. 2193-2196.

"Exploration of Multimedia Trend and Strategies Underlying SH7600 Series", pp. 32-33, Nikkei Electronics, May 23, 1994, vol. 68, Nikkei Business Publications, Inc. (with translation).

* cited by examiner

FROM SYSTEM TIMING CIRCUIT

FROM SYSTEM TIMING CIRCUIT

WRITE TIMING OF POWER RAMPING RAM

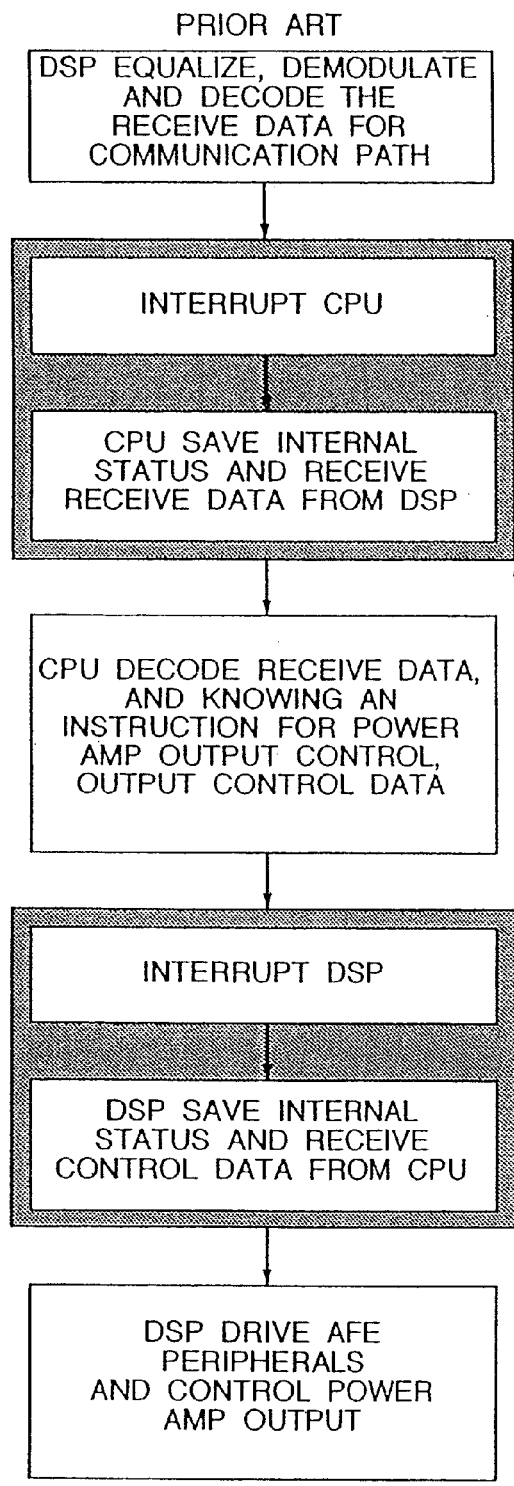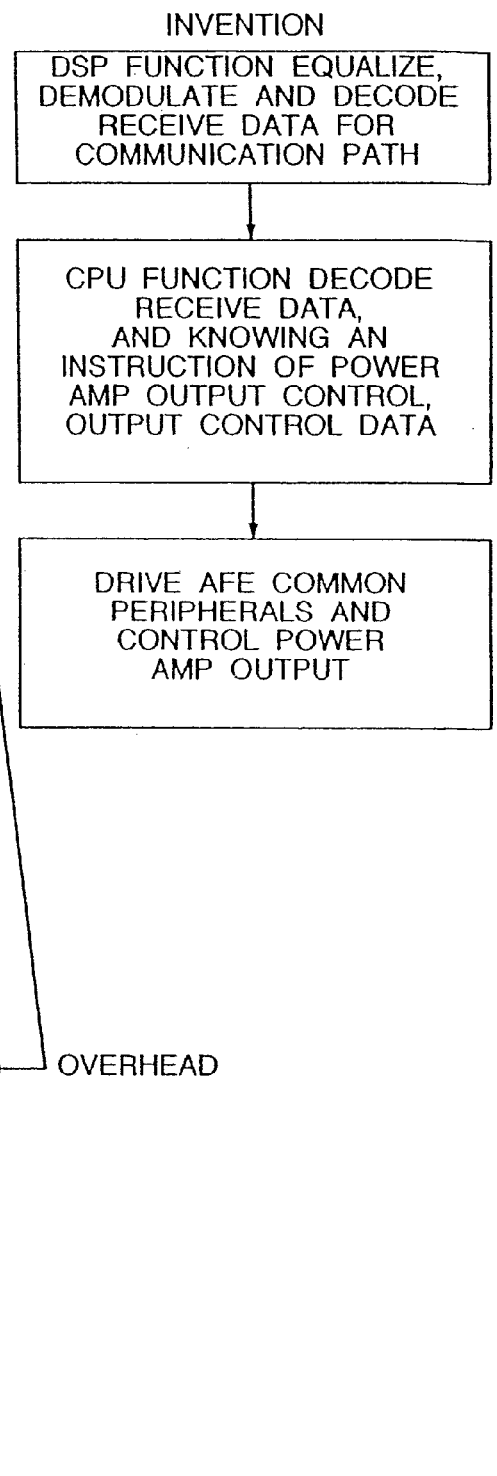

```
short XARRAY[4]={1,2,3,4};
short YARRAY[4]={1,1,1,1};
short ZARRAY[2];

main(){ short *x_pntr, *y_pntr1, *y_pntr2;

x_pntr=XARRAY;      /*INITIALING x_pntr*/
    y_pntr1=YARRAY;     /*INITIALING y_pntr1*/
    y_pntr=ZARRAY;      /*INITIALING y_pntr2*/

/*CALL MULTIPLY AND ACCUMULATE ROUTINE/*
    mac_sss(4, x_pntr, y_pntr1, y_pntr2);
}
```

R4 R5 R6 R7
X POINTER  Y POINTER

… (US 8,090,398 B2)

TERMINAL APPARATUS

CROSS REFERENCE TO RELATED APPLICATION

This application is a continuation application of U.S. patent application Ser. No. 11/289,389, filed Nov. 30, 2005 now abandoned, which, in turn, is a continuation of Ser. No. 10/639,445, filed Aug. 13, 2003, now U.S. Pat. No. 6,993,597, which is a continuation application of U.S. patent application Ser. No. 10/028,425, filed Dec. 28, 2001, now U.S. Pat. No. 6,643,713, which is a continuation of application Ser. No. 09/051,286, filed Dec. 1, 1998, now U.S. Pat. No. 6,353,863, the subject matters of which are incorporated hereby by reference. U.S. application Ser. No. 09/051,286 is a U.S. National Stage Application of PCT International Application No. PCT/JP96/02910, filed Oct. 7, 1996.

TECHNICAL FIELD

The present invention relates to a terminal apparatus for a mobile communication system including a digital cellular portable telephone, or more in particular to a method of realizing a mobile communication baseband system using data processing units such as a programmable microprocessor (hereinafter referred to as "the CPU") and a digital signal processor (hereinafter referred to as "the DSP").

BACKGROUND ART

The processes for a mobile communication system relating to the present invention will briefly be described with reference to FIG. 1. FIG. 1 shows a user 102, a communication terminal 101 and a base station 100. The user 102 accesses the base station 100 using the communication terminal 101 and thus receives various services. The communication with other communication terminals is also performed through the base station 100. The communication process between the communication terminal and the base station, therefor, constitutes the essential part of the communication.

The communication terminal 101 includes a user interface/system controller 109 having the user interface function and the system control function, a communication protocol processing unit 110 having the communication protocol processing function, a code/decode processing unit 111 having the speech coding/decoding function, the channel coding/decoding function, the modulation/demodulation function, etc., and an AFE/RF circuit section 105 having an analog front end (AFE) and an RF circuit. The communication terminal 101 is connected with a microphone (MIC) 103 and a speaker (SPK) 104. The base station 100 includes a system controller 112 having the system control function, a communication protocol processing unit 113 having the communication protocol processing function, a channel coding/decoding function, the modulate/demodulate function, etc., and an AFE/RF circuit section 106 having an analog front end (AFE) and an RF circuit.

The communication terminal 101 exchanges information with the base station 100 generally in one of two modes: Audio or the like user data are exchanged, or control data for system management are exchanged.

Audio data are exchanged in the following manner. The audio data input from the microphone (MIC) 103 are converted into digital data and compressed by the speech encoding process in the code/decode processing unit 111. The compressed audio data have added thereto error correction information by the channel encoding process in the code/decode processing unit 111, and then modulated by the modulation process in the code/decode processing unit 111. These processes are performed in a digital area. The modulated digital voice is converted into analog data in the analog front end (AFE) of the AFE/RF circuit section 1605, and transmitted from an antenna 107 over a radio-frequency wave by the RF circuit of the AFE/RF circuit section 105. This radio wave is received by an antenna 108 of the base station 100 and temporarily demodulated. This radio wave is modulated again on the frequency (in the case of frequency multiplexing) assigned to the other party of communication, and retransmitted from the base station to the other party in a timing of time slots (in the case of time division multiplexing) assigned to the other party.

Now, the exchange of the control data for system management will be explained. The communication protocol processing unit 110 in the communication terminal 101 and the communication protocol processing unit 113 in the base station 100 exchange data with each other. A virtual logic connection is established between these two functions. This virtual logic connection is realized by a physical connection described below. In the case where the base station 100 issues some instruction to the communication terminal, the process is performed as follows. The instruction data according to a predetermined protocol is encoded for the communication path and modulated in the code/decode processing unit 114. The resulting data are converted into analog data in the analog front end (AFE) of the AFE/RF circuit section 106, and transmitted from the RF circuit over a radio wave by way of the antenna 108. This radio wave is received by the antenna 107 of the communication terminal 101 and converted into baseband digital data through the RF circuit of the RF circuit 105 and the analog front end (AFE). The digital data are further demodulated and decoded for the communication path by the code/decode processing unit 111 and delivered to the communication protocol processing unit 110.

The two manners in which the communication terminal 101 exchanges data with the base station 100 and the related processes are described above. The processes related to these operations are generally divided into two types. The speech coding/encoding process, the channel coding/decoding process and the modulation/demodulation process are classified as a digital signal process which is suitably realized by an exclusive hardware or a programmable DSP (digital signal processor). The communication protocol process, on the other hand, is so complicated that it is suitably realized by software using a high-level language such as the C language.

In view of these facts, a method has recently been proposed in which the speech coding/encoding process, the channel coding/decoding process and the modulate/demodulate process are performed by a DSP, and the communication protocol process is performed by a CPU (general-purpose microprocessor), among the baseband processes of the mobile communication terminal ("Latest Information on GSM/Systems, Terminals and Services", Seminar materials, Japan Industrial Technological Center, May 18 to 19, 1965, and "Development Trend of GSM Telephone Terminal Devices", pp. 118-130, Japan Phillips).

Explanation will be made about an example of a mobile communication terminal including a DSP and a CPU studied by the inventor according to the above-mentioned well-known examples. The example explained below is not an exact replica of any well-known examples. This mobile communication terminal is intended for the GSM (global system for mobile communications) constituting a specification of a digital cellular telephone in Europe. The mobile communication terminal shown in FIG. 2 includes a DSP chip 223, a DSP RAM (random access memory) 200, a DSP ROM (read-only memory) 201, a CPU chip 227, a baseband analog front end (AFE) 202, a RF modem 210, a power amplifier (PA) 212, an antenna 213, a duplexer 214, a low-noise amplifier (LNA) 215, a microphone 208, an amplifier Amp, a speaker 209, a drive circuit Dri, a frequency synthesizer 216, a system timing circuit 219, a voltage controlled system clock 221, a ¼ frequency dividing circuit 222, a sounder DA converter 231, a sounder 230, a drive circuit Driver, a battery monitor AD converter 232, battery monitor circuit 233, a battery 234, a CPU RAM 239, a CPU ROM 238, an LCD (liquid crystal device and a liquid crystal panel) 237, a SIM (subscriber identity module) 236 and a keyboard 235. The baseband analog front end (AFE) 202 includes a PA (power amp) D/A converter 203, an I/Q AD/DA converter 204, an AGC (auto gain control) D/A converter 205, an audio AD/DA converter 206, and an AFC (auto frequency control) D/A converter 207. The DSP RAM (200) and the DSP ROM (201) are connected through an external DSP bus 240 to the DSP chip 223.

The function and operation of this terminal will be explained briefly. During the audio transmission, the voice input from the microphone 208 is amplified by the amplifier Amp, and converted into digital data by being sampled at the audio A/D converter 206. The sampling rate is 8 kHz, and the bit accuracy is 13 bits. The data thus digitized is sent to the DSP chip 223, and after being compressed and encoded for the communication path, delivered to the I/Q D/A converter 204 of the analog front end (AFE) 202. This signal is modulated and converted into analog data and input to the RF modem 210. The resulting signal is sent out from the antenna 213 over an RF frequency (800 MHz). The duplexer (214) is used for separating the input radio wave from the output radio wave. The high-frequency sine wave 217 used for high-frequency modulation/demodulation is synthesized by a frequency synthesizer 216. The frequency synthesizer 216 is connected through a signal line 218 to the CPU chip 227. The ROM (201) has built therein a program executed by the DSP chip 223. The RAM (200) is used for operating the DSP chip 223.

At the time of audio receiving, the data received by the antenna 213 are input to the RF modem 210 through the low-noise amplifier (LNA) 215. This signal is converted into a low-frequency baseband analog signal, and is delivered to the I/Q A/D converter 204 of the analog front end (AFE) 202. The data sampled and converted into digital data are sent to the DSP chip 223 where it is demodulated, channel decoded and decompressed. After that, the data is converted into analog data at the audio D/A converter 206 and output from the speaker 209.

When the user makes a phone call, he uses a keyboard 235 and an LCD (237). The SIM 236 is a replaceable user ID module, which is mounted on the communication terminal to enable the user to use the terminal exclusively. The ROM (238) has built therein a program that can be executed by the CPU chip 227. The RAM (239) is used for operating the CPU chip 227. The battery 234 is a main battery for the whole terminal, and the remaining capacity of the battery 234 is monitored by the CPU chip 227 through the battery monitor circuit 233 and the battery monitor A/D converter 232. When there is a telephone call, the CPU chip 227 turns on the sounder 230 through the sounder D/A converter 231.

The basic clock 13 MHz of this terminal is supplied from the voltage controlled system clock 221. From this basic clock, the system timing circuit 219 produces required system timing signals 241, 220 and distribute them into the terminal. The basic clock is also supplied to the DSP chip 223 and the CPU chip 227. The DSP processing in the GSM is said to require 20 to 50 MIPS (mega instructions per second). In FIG. 2, the DSP chip operates at 52 MHz, i.e., a frequency four times as high as the basic clock 13 MHz using a PLL (phase locked loop) circuit 225 mounted in the DSP chip. The CPU processing in the GSM, on the other hand, is said to require 1 to 2 MIPS. In FIG. 2, therefore, a frequency one fourth the basic clock 13 MHz is generated by the ¼ frequency divider circuit 222, and the CPU is operated at this rate.

The basic clock 13 MHz of the terminal is required to be strictly synchronized with the master clock frequency 13 MHz of the base station. This is achieved in the manner described below. First, the strict frequency information is received from the base station. The DSP controls the voltage controlled system clock 221 through an AFC (automatic frequency control) D/A converter 207 on the basis of this information thereby to regulate the frequency. Also, an instruction for outputting a radio wave may be applied from the base station to the terminal. In that case, the DSP chip 223 drives the PA (power amplifier) D/A converter 203 and regulates the output of the power amplifier (PA) 212. Further, the DSP chip 223 regulates the gain of the RF modem through the AGC (automatic gain control) D/A converter 205 on the basis of the amplitude information of the received signal.

The communication between the DSP chip 223 and the CPU chip 227 is effected in the following manner. The DSP chip 223 is connected through a DSP host interface (HIF) 224 to a CPU external bus 229 of the CPU chip. The CPU chip 227 can freely read and write the internal resources of the DSP chip 223 from the DSP host interface (HIF) 224 through the CPU external bus interface 228 and the CPU external bus 229. When the DSP chip 223 is desirous of informing the CPU chip 227, an INT (interrupt) signal 226 is used.

The above-described conventional method using two independent units of DSP and CPU, however, requires two different memory systems for the DSP and the CPU. In the above-mentioned well-known system, all the DSP memories are formed on a chip. This is because that the GSM system has just introduced and the capacity required for the DSP memory is still small. In the case where the half-rate audio encoding technique is introduced in full scale with the increase in the number of subscribers in the future, however, the terminal is required to accommodate both the full-rate and the half-rate techniques. In that case, both of the speech encoding programs are required to be incorporated in the DSP. Further, since the current full-rate sound quality for the GSM system is not satisfactory, an enhanced full-rate audio encoding system is being studied. Once this system is realized, three speech encoding programs must be incorporated. Also, a DSP program for an added value such as a speech recognition program for voice dialing will probably be incorporated as a technique for differentiating the communication terminals. Therefore, it is not practicable, if only in terms of cost, to package as a chip all the DSP programs expected to increase in the future.

In the future, therefore, a memory external to the DSP seems unavoidable. In view of the fact that the reduction in cost, power consumption and size is crucial for a mobile communication terminal, however, the use of two external memories poses a great problem.

On the other hand, two systems of data input-output peripheral units have so far been required for DSP and CPU. This causes an extraneous communication overhead between the DSP and the CPU.

DISCLOSURE OF INVENTION

In view of the above-mentioned problem points, the object of the present invention is to provide a method of realizing a mobile communication terminal system low in cost, power consumption and size by integrating the memory systems and the peripheral circuits of the DSP and the CPU.

The above-mentioned and other objects of the present invention and the novel features thereof will be made apparent from the following description of the specification and the accompanying drawings.

Representative aspects of the invention disclosed in this patent application are briefly described below.

Specifically, a mobile communication terminal system is realized by a DSP/CPU integrated chip comprising a DSP/CPU core integrated as one bus master, an integrated external bus interface and an integrated peripheral circuit interface.

Also, in order to increase the speed of access to the external memory by the DSP, programs and data for an internal memory and an external memory are arranged according to the processing of the mobile communication terminal.

Further, in order to improve the speed of access to the peripheral circuit by the DSP, a plurality of samples are transferred concurrently.

In generating a program for a microprocessor used for the mobile communication terminal, the address register for the digital signal processor for realizing the DSP function is mapped to the register subset of the central processing unit for realizing the CPU function, and an argument is transferred to the register subset of the central processing unit.

Also, the mobile communication terminal for effecting radio communication by exchanging data with the base station includes a data processing unit for executing a program stored in a memory, and a memory having an area for storing a speech encoding program, an area for storing a speech decoding program, an area for storing a channel encoding program, an area for storing a channel decoding program, an area for storing a program for controlling the protocol for communication with the base station, and an area for storing a user interface control program. Each area of the memory is arranged in an address space of the data processing unit.

The data processing unit includes a digital signal processor for executing the speech encoding process, the speech decoding process, the channel encoding process and the channel decoding process, and a central processing unit for controlling the protocol for communication with the base station and also controlling the interface with the user. These functions are desirably arranged on a single semiconductor substrate.

In order to improve the processing speed of the digital signal processor, the area for storing the speech encoding program, the area for storing the speech decoding program, the area for storing the channel encoding program and the area for storing the channel decoding program, are stored preferably in a memory built in the data processing unit.

The areas for a program not requiring a high-speed processing including the area for storing a program for controlling the protocol for communication with the base station and the area for storing a program for controlling the interface with the user, on the other hand, are stored preferably in a memory external to the data processing unit.

The data processing unit further comprises a serial input-output circuit for interfacing with an analog-digital conversion circuit and a digital-analog conversion circuit in the address space of the central processing unit.

BRIEF DESCRIPTION OF THE DRAWINGS

FIGS. 20A, 20B are diagrams showing an overhead in power amplifier control according to the eighth embodiment of the invention.

BEST MODE FOR CARRYING OUT THE INVENTION

[DSP/CPU Integrated Chip]

Figure 3:
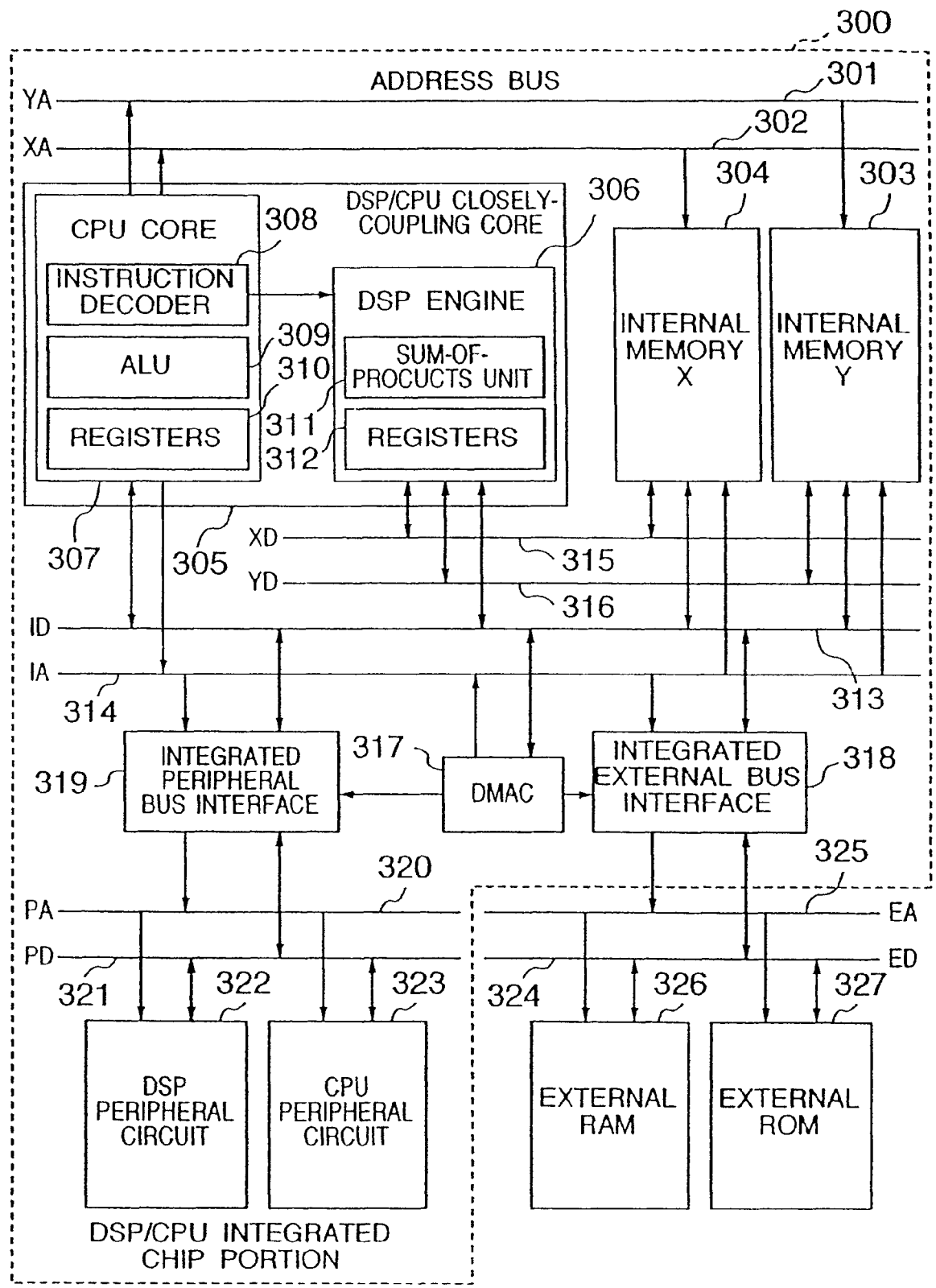
FIG. 3 is a diagram showing a configuration of a DSP/CPU integrated chip closely coupled with each other.

The DSP/CPU integrated chip closely coupled on which the invention is based will be explained. Details are described in JP-A-7-132906 filed by the same inventors. An example of the closely-coupled DSP/CPU integrated chip is shown in FIG. 3. A DSP/CPU integrated chip 300 defined by dotted line in FIG. 3 is formed on a single semiconductor substrate made of such material as single crystal silicon by the semiconductor integrated circuit fabrication techniques. FIG. 3 shows the DSP/CPU integrated chip 300, an external RAM (random access memory) 326, an external ROM (read only memory) 327, an external address bus (EA) 325, and an external data bus (ED) 324 defined by the dotted line.

The DSP/CPU integrated chip 300 includes a DSP/CPU closely-coupling integrated core 305, an internal memory X 304, an internal memory Y 303, an integrated bus interface 418, a DMAC (direct memory access controller) 317, an integrated peripheral bus interface 419, a DSP peripheral circuit 322 and a CPU peripheral circuit 323. These component elements are connected to each other through three types of internal memory address buses including an X address bus (XA) 302, a Y address bus (YA) 301 and an I address bus (IA) 314, three types of internal memory data buses including an X data bus (XD) 315, a Y data bus (YD) 316 and an I data bus (ID) 313, an integrated peripheral address bus (PA) 320, and an integrated peripheral data bus (PD) 321.

The DSP/CPU closely-coupling integrated core 305 includes a CPU core 307 and a DSP engine 306. The main component elements of the CPU core 307 are an instruction decoder 308, an ALU (arithmetic-logic unit) 309 and registers 310. The main component elements of the DSP engine 306 are arithmetic units including a Multiply and Accumulate unit 311 and registers 312, but not an instruction decoder.

The CPU core 307 reads an instruction from the internal memory X 304, the internal memory Y 303, the external RAM 326 or the external ROM 327, which instruction is decoded by the instruction decoder 308 and executed. The DSP engine 306 operates in accordance with the instruction from the CPU core 307. In other words, when the instruction from the DSP is executed, the CPU core 307 and the DSP engine 306 operate concurrently in interlocked relation.

The DSP as referred to herein is defined as the ability to execute the FIR (finite response filter) operation constituting the basic digital signal processing operation at the rate of one cycle per tap. Generally, this is required to meet the following four conditions at the same time. They are (1) the Multiply and Add operation can be executed in one cycle, (2) two data can be accessed simultaneously from memory in one cycle, (3) instruction repeat is supported without overhead, and (4) the modulo addressing mode is supported. These DSP functions are disclosed in detail as well-known information in, for example, "DSP56116 Digital Signal Processor User's Manual" issued by Motorola Inc., 1990. In view of these four conditions, a simple Multiply and Accumulate unit or an FPU (floating point unit) cannot be called a DSP engine herein.

The CPU referred to herein, on the other hand, means a standard microprocessor having an architecture that can efficiently compile and execute a program written in a high-level language such as the C language. An example is disclosed in detail in "Hitachi Single-Chip RISC Microcomputers SH7032, SH7034 Hardware Manual", third edition, March 1964, issued by Hitachi Ltd.

As described above, the feature of the DSP/CPU closely-coupling integrated core 405 shown in FIG. 3 lies in that it has both the standard CPU function capable of efficiently compiling and executing a program written in a high-level language such as the C language and the DSP function capable of executing the FIR filter operation at the rate of a cycle per tap, which two functions are controlled by a single instruction stream. Also, the DSP/CPU closely-coupling integrated core 305, which has only one instruction decoder and one control system, is integrated as a single unit when viewed as a bus master. In other words, the peripheral circuits and memories associated with the buses are shared integrally by the DSP function and the CPU function. The program for executing the DSP function and that for executing the CPU function are both arranged in the address space of the CPU core 307. FIG. 3 shows the manner in which a DSP peripheral circuit 322 and a CPU peripheral circuit 323 are integrated through an integrated peripheral bus interface 319. An example of the DSP peripheral circuit 322 is a serial input-output circuit. Examples of the CPU peripheral circuit 323 are a parallel input-output circuit, a serial input-output circuit, a timer and an A/D converter circuit. The DSP peripheral circuit 322 and the CPU peripheral circuit 323 are integrated with each other, that is, they are arranged in a common address space. The DSP peripheral circuit 322 and the CPU peripheral circuit 323 can both be used by the DSP function and the CPU function. FIG. 3 also shows the manner in which the external RAM 326 and the external ROM 327 are shared by the DSP function and the CPU function through an integrated external bus interface.

[Independent DSP and CPU Chips]

Figure 4:
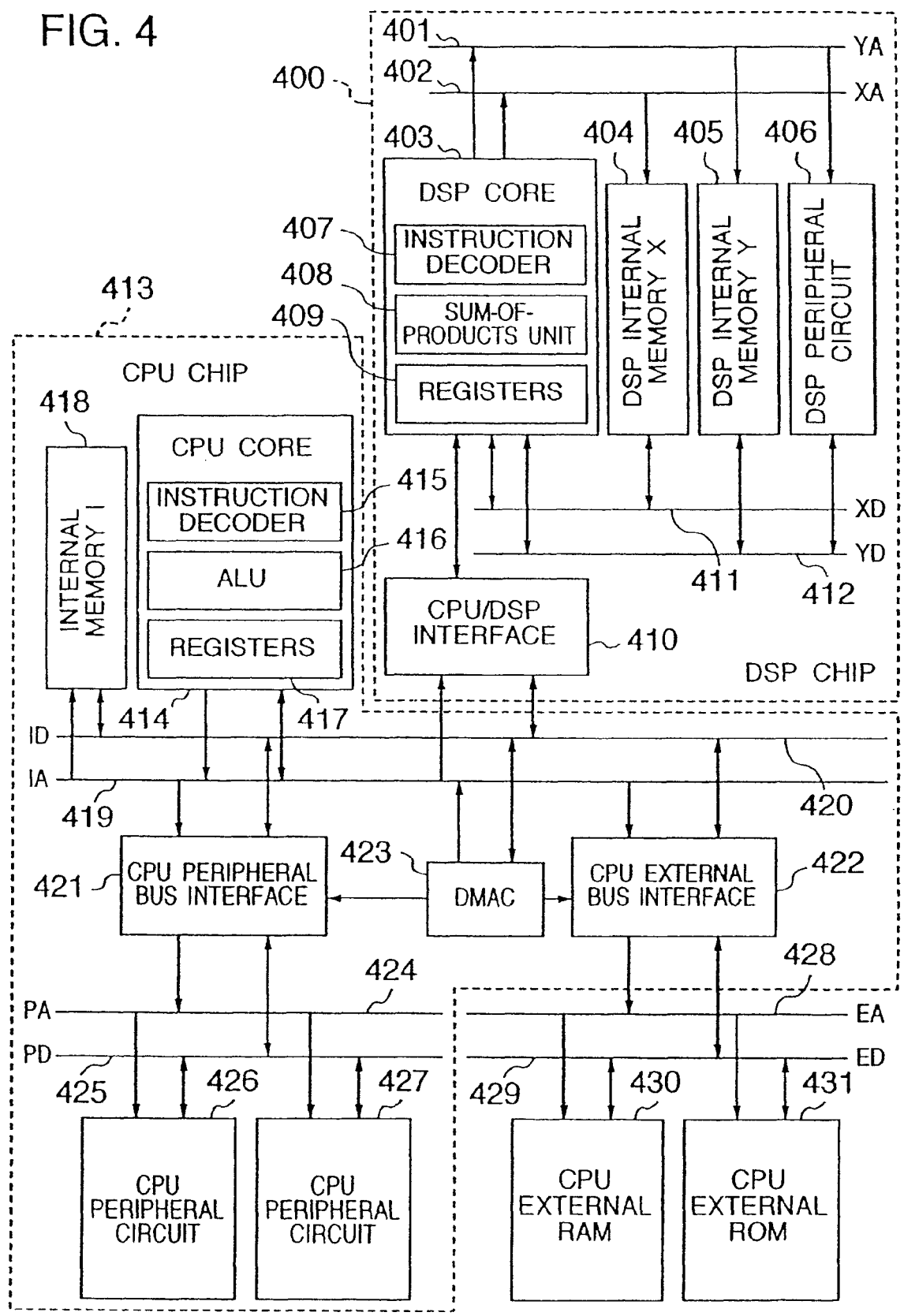
FIG. 4 is a diagram showing a configuration of a DSP and a CPU integrated simply into a single chip.

By way of comparison, a conventional case in which a DSP and a CPU are used as elements independent of each other will be explained with reference to FIG. 4. FIG. 4 is prepared by the inventors according to a well-known example and is not an exact replica of the well-known example. The system of FIG. 4 comprises a DSP chip 400 defined by dotted line, a CPU chip 413 defined by dotted line, a CPU external RAM 430 and a CPU external ROM 431. In the case where the DSP chip and the CPU chip are incorporated on a single chip in simple fashion, the two areas defined by the dotted lines constitute one integrated circuit.

The CPU chip 413 includes a CPU core 414, an internal memory 418, a CPU peripheral bus interface 421, a CPU external bus interface 422, a DMAC 423, and a CPU peripheral circuits 426, 427.

These component elements are connected to each other through an internal bus address (IA) 419, an internal data bus (ID) 420, a CPU peripheral address bus (PA) 424, and a CPU peripheral data bus (PD) 425. The main component elements of the CPU core are an instruction decoder 415, an ALU 416 and registers 417. The CPU core reads an instruction from the internal memory 418, the CPU external RAM 430 or the CPU external ROM 431, which instruction is decoded by the instruction decoder and executed. The CPU external bus interface 422, the CPU external RAM 430 and the CPU external ROM 431 are connected to each other through an external address bus (EA) 428 and an external data bus (ED) 429. The DSP chip 400 includes a DSP core 403, a DSP internal memory X 404, a DSP internal memory Y 405, a DSP peripheral circuit 406, a CPU/DSP interface 410, a Y address bus (YA) 401, an X address bus (XA) 402, an X data bus (XD) 411 and a Y data bus (YD) 412. The DSP core 403, on the other hand, includes an instruction decoder 407, arithmetic units including a Multiply and Accumulate unit 408 and a register 409. The DSP core 403 reads a DSP exclusive instruction from the DSP internal memory X 404 or the DSP internal memory Y 405, which instruction is decoded by the instruction decoder 407 and executed. In the case where the DSP has an exclusive external memory, though not shown in FIG. 4, such a DSP exclusive instruction may be read from such an external memory, decoded by the instruction decoder 407 and executed. In FIG. 4, the internal address bus (IA) 419 and the internal data bus (ID) 420 are connected to the CPU/DSP interface 410. Instead, CPU/DSP interface 410 is connected to the external address bus (EA) 428 and the external data bus (ED) 429, when CPU chip 413 and DSP chip 400 are structured by independent chips.

In the case where a DSP chip and a CPU chip are incorporated in a single chip in simple fashion as described above, the respective memory spaces and peripheral circuits are completely independent of each other and cannot be mutually accessed.

The features of a closely-coupled DSP/CPU integrated chip on which the invention is based have been described above. Now, the features of a mobile communication terminal realized using this closely-coupled DSP/CPU integrated chip will be explained with reference to embodiments.

First Embodiment

GSM Terminal

Figure 2:
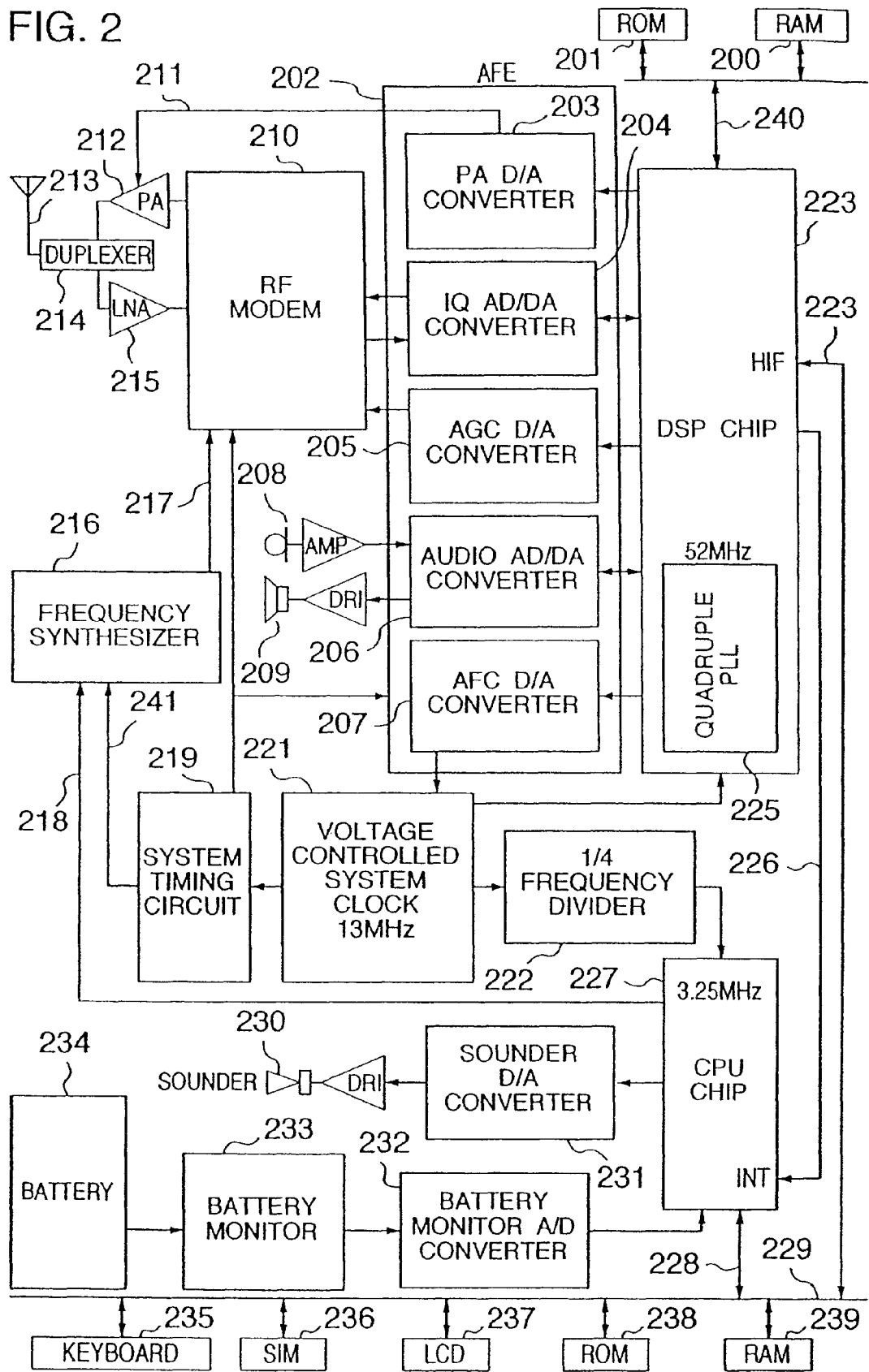
FIG. 2 is a diagram showing a configuration of a GSM mobile communication terminal using a DSP and a CPU.
Figure 5:
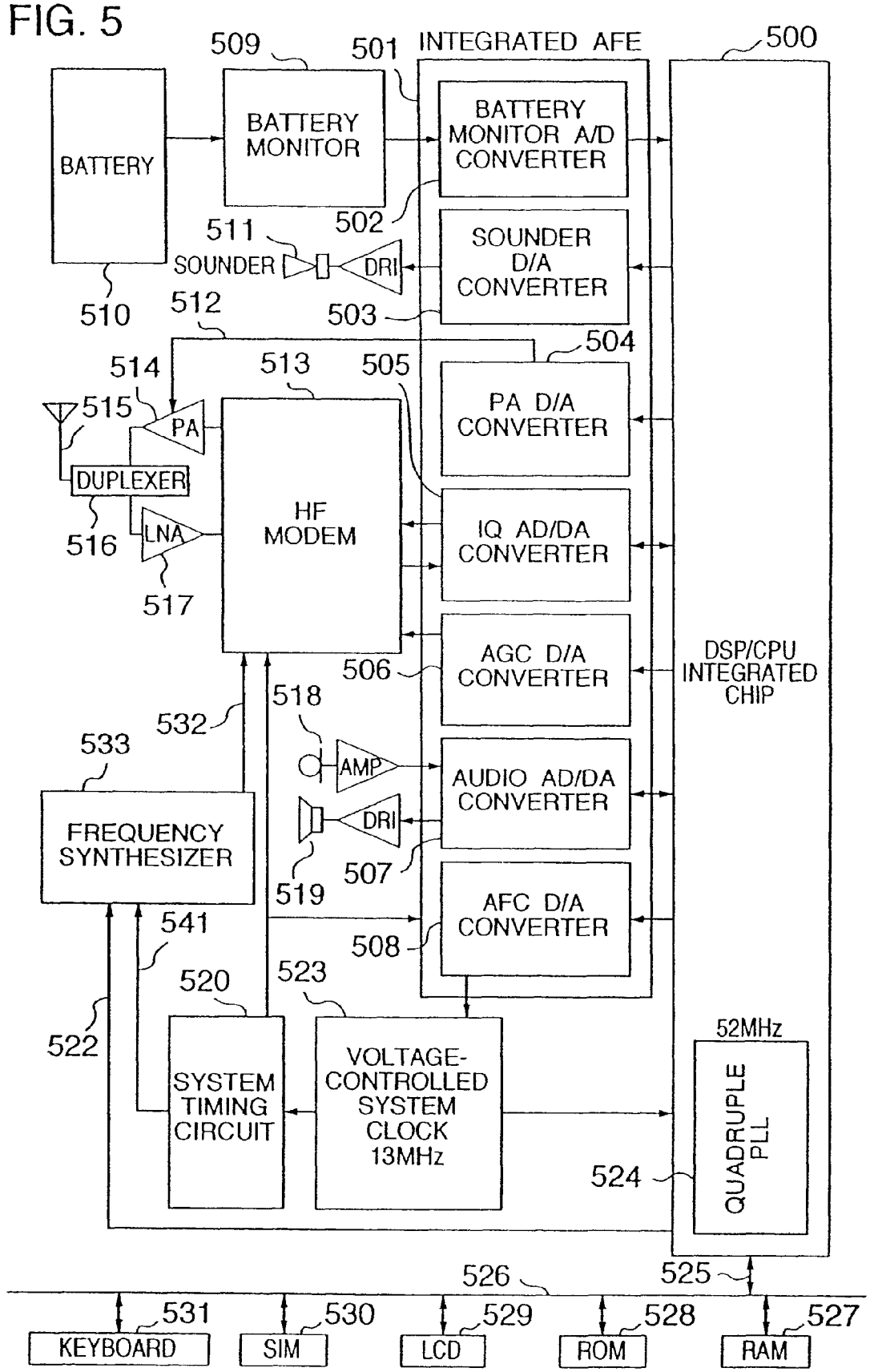
FIG. 5 is a diagram showing a configuration of a GSM mobile communication terminal according to a first embodiment of the invention.

A first embodiment of the invention will be explained with reference to FIGS. 2, 5 and 6. FIG. 5 shows an example of a GSM terminal realized using a closely-coupled DSP/CPU integrated chip. The configuration shown in FIG. 5 is basically the same as that of FIG. 2 described in detail above. In FIG. 5, the two independent chips including the DSP chip 223 and the CPU chip 227 used for the GSM terminal of FIG. 2 are replaced by a single closely-coupled DSP/CPU integrated chip. The GSM terminal of FIG. 5 comprises a DSP/CPU integrated chip 500, an integrated AFE (analog front end) 501, a battery 510, a battery monitor circuit 509, a sounder 511, a RF circuit 513, a PA (power amplifier) 514, an antenna 515, a duplexer 516, an LNA (low-noise amplifier) 517, a microphone 518, a speaker 519, a frequency synthesizer 533, a system timing circuit 520, a voltage-controlled system clock 523 and integrated modules 527 to 531 connected to an integrated external bus 526.

The integrated modules include an external RAM 527 shared by the DSP/CPU, an external ROM 528 shared by the DSP/CPU, an LCD 529, an SIM 530 and a keyboard 531. The DSP/CPU integrated chip 500 is identical to the DSP/CPU integrated chip 300 shown in FIG. 3. The integrated AFE (analog front end) 501 includes a battery monitor A/D converter 502, a sounder D/A converter 503, a PA D/A converter 504, an IQ AD/DA converter 505, an audio AD/DA converter 506 and an AFC D/A converter 507. The battery 510, the battery monitor circuit 509, the sounder 511, the drive circuit Driver, the RF modem circuit 513, the PA (power amplifier) 514, the antenna 515, the duplexer 516, the LNA (low-noise amplifier) 514, the microphone 518, the amplifier Amp, the drive circuit Dri, the speaker 519, the high-frequency sine wave 532, the frequency synthesizer 533, the system timing circuit 20, the system timing signals 521, 541, the signal line 522, the voltage-controlled system clock 523, the battery monitor A/D converter 502, the sounder D/A converter 503, the PA D/A converter 504, the IQ A/D converter 505, the AGC D/A converter 506, the audio AD/DA converter 507, the AFC D/A converter 508, the LCD 529, the SIM 530 and the keyboard 531, respectively, correspond to and have the same function and operate the same way as the components in FIG. 2 including the battery 234, the battery monitor circuit 233, the sounder 230, the drive circuit Driver, the RF modem circuit 210, the PA (power amplifier) 212, the antenna 213, the duplexer 214, the LNA (low-noise amplifier) 215, the microphone 208, the amplifier Amp, the drive circuit Dri, the speaker 209, the frequency synthesizer 216, the system timing circuit 219, the system timing signals 220, 241, the signal line 218, the voltage-controlled system clock 221, the battery monitor A/D converter 232, the sounder D/A converter 231, the PA D/A converter 203, the IQ AD/DA converter 204, the AGC D/A converter 205, the audio AD/DA converter 206, the AFC D/A converter 207, the LCD 237, the SIM 236 and the keyboard 235, respectively. The function and operation of the GSM terminal of FIG. 5 are the same as those of FIG. 2 and will not be explained. The integrated external bus 526 is connected with the external RAM 527 and the external ROM 528 permitting access thereto by both the CPU function and the DSP function.

Figure 6:
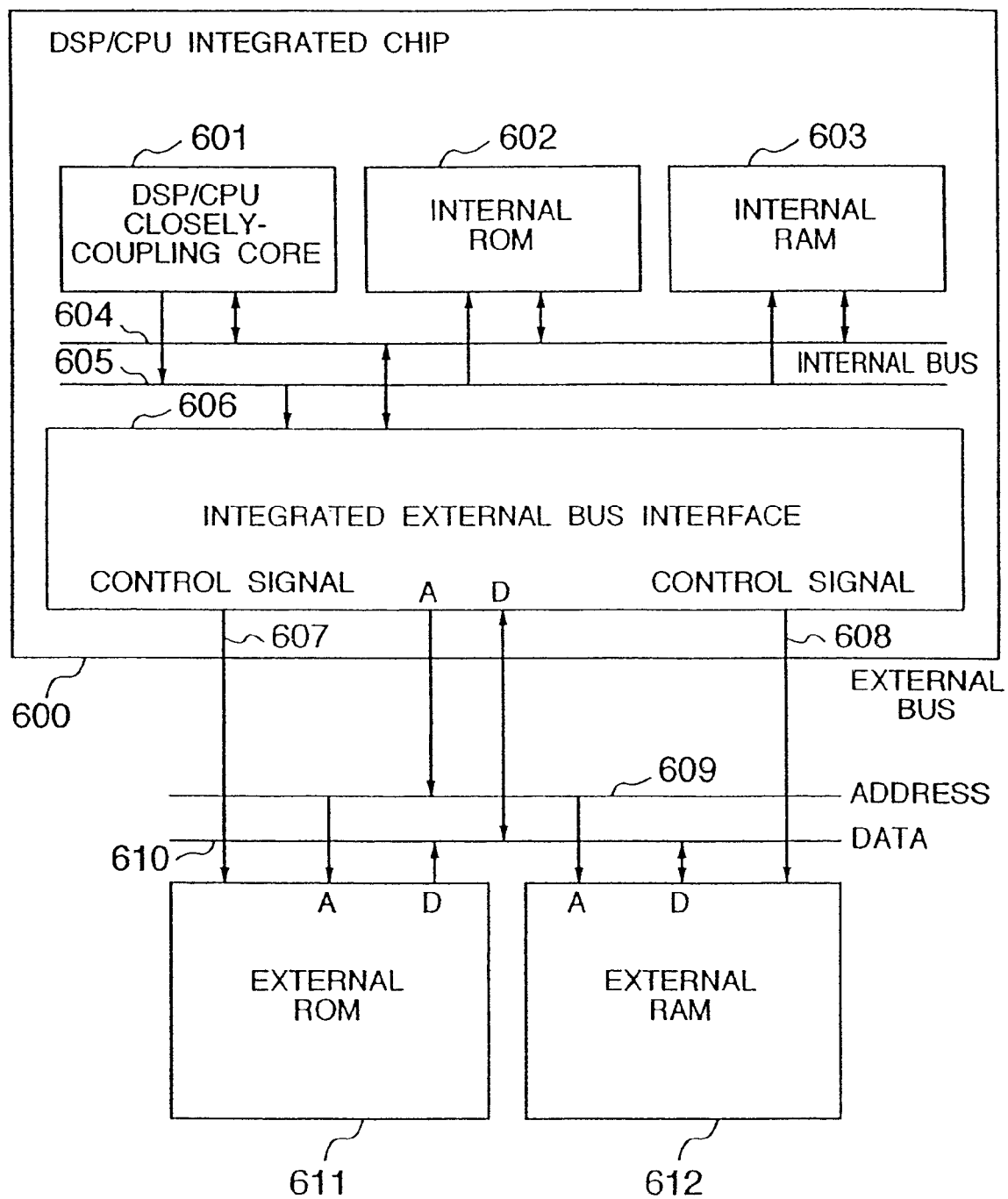
FIG. 6 is a diagram showing a configuration of an internal memory and an external memory connected according to a first embodiment of the invention.

FIG. 6 shows the detailed relation between the DSP/CPU integrated chip with the internal memory and the external memory. In FIG. 6, the DSP/CPU integrated chip 600, the external ROM 611 and the external RAM 612 are connected through the external address bus 609 and the external data bus 610. Also, FIG. 6 shows the manner in which the DSP/CPU closely-coupling core 601, the internal ROM 602, the internal RAM 603 and the integrated external bus interface 606 are connected to each other through the internal data bus 604 and the internal address bus in the DSP/CPU integrated chip 600. The DSP/CPU closely-coupling core 601 is integrated as a single bus master. The great feature of this configuration, therefore, is that both the DSP function and the CPU function can arbitrarily access any of the internal ROM 602, the internal RAM 603, the external ROM 611 and the external RAM 612. This configuration makes it especially possible to use the internal memory effectively without any waste.

The DSP/CPU integrated chip 600 is identical to the DSP/CPU integrated chip 300 of FIG. 3 and the DSP/CPU integrated chip 500 of FIG. 5. Other component elements of the DSP/CPU integrated chip 600 are not shown, however, as they are not necessary for explanation. Therefore, the DSP/CPU closely-coupling core 601 corresponds to the DSP/CPU closely-coupling core 305, the internal bus 604 to the internal memory data bus ID 313, the internal bus 605 to the internal memory address bus 605, and the integrated external bus interface 606 to the integrated external bus interface 318. The internal ROM 602 and the internal RAM 603, however, correspond respectively to the ROM and the RAM of the internal memory X 304 and the internal memory Y 303.

The external address bus 609 corresponds to the external address bus (EA) 3125, the external data bus 610 to the external data bus (ED) 324, the external ROM 611 to the external ROM 327 and the external ROM 528, and the external RAM 612 to the external RAM 326 and the external RAM 527. Also, the external bus 526 includes both the external address bus 609 and the external data bus 610.

As shown in FIGS. 5 and 6, according to the first embodiment of the invention, the external RAM and ROM are completely shared by the DSP and the CPU, and therefore, the need is eliminated of the external bus 240, the external RAM 200 and the external ROM 201 exclusive to the DSP that are used in the prior art shown in FIG. 2. Also, the signals HIF214 and the INT226 between the DSP chip 223 and the CPU chip 227 are eliminated. In this way, the integration can reduce the number of the buses, the signal lines and the memory chips and hence can realize a mobile communication terminal low in cost, small in power consumption and small in size.

Second Embodiment

Built-In Cache Memory

A second embodiment of the invention will be described with reference to FIGS. 5, 6 and 7. In the second embodiment, the internal RAM of the DSP/CPU integrated chip of the first embodiment is replaced by a cache memory to improve the speed of external memory access.

The external memory that can be directly coupled to the conventional independent DSP is limited to a SRAM (static RAM) or a ROM. A DRAM or a RAM/ROM having a high-speed access mode cannot be directly connected to the conventional independent DSP. Also, the accessible data size is limited to 16 bits, and access in byte (8 bits) or long word (32 bits) are impossible. This is because the length of instructions and data are fixed to 16 bits in the DSP chip used with the mobile communication terminal, which in turn is derived from the fact that the speech coding, the channel coding and the modulation/demodulation process to which the DSP is applied are sufficiently performed by the instruction and data length of 16 bits. The limitation of accessible data size to 16 bits facilitates the control of external memory access, and makes it possible to execute the external access in one cycle if a sufficiently high-speed memory is used.

On the other hand, some of the conventional independent CPU chips are connected directly to various external memories including a DRAM or a RAM/ROM having a high-speed access mode. An example is described in "Hitachi Single-Chip RISC Microcomputers SH7032, SH7034 Hardware Manual", Third Edition, March 1994, issued by Hitachi Ltd. It is also commonly known that these CPU chips support all of the byte (8 bit) access, the short word (16 bits) access and the long word (32 bits) access, since it is indispensable for efficiently executing a program written in a high-level language such as the C language. In spite of this, however, external memory access is complicated to control and requires at least 3 cycles.

As described above, the conventional DSP chip and the CPU chip have support different external memory interfaces suitable for their respective applications. In the case where the DSP function and the CPU function are integrated with each other as in the present invention, the conventional external memory interface of CPU type is desirably used. Nevertheless, the problem is posed of slow external access for the DSP function.

In view of this, according to the second embodiment, the internal RAM of the DSP/CPU integrated chip of the first embodiment is replaced by a cache memory to improve the external memory access speed. FIG. 7 shows in detail the relation between the DSP/CPU integrated chip, the cache (internal memory) and the external memory in the case where the internal RAM of FIG. 6 is replaced by a cache memory.

Figure 7:
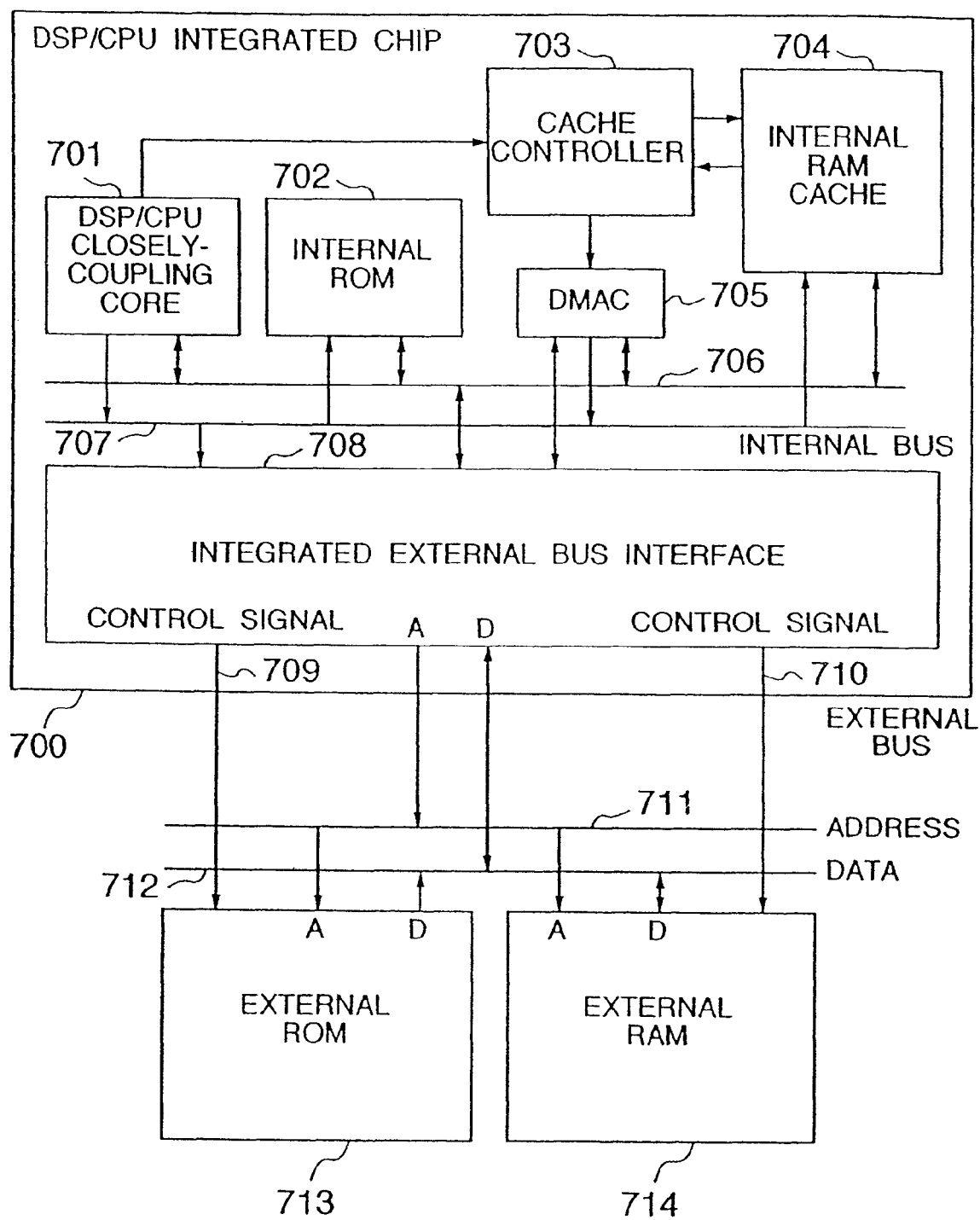
FIG. 7 is a diagram showing a configuration of a DSP/CPU integrated chip with a cache according to a second embodiment of the invention.

In FIG. 7, the DSP/CPU integrated chip 700, the external ROM 713 and the external RAM 714 are connected to each other through the external address bus 711 and the external data bus 712. FIG. 7 also shows the manner in which a DSP/CPU closely-coupling core 701, an internal ROM 702, a cache (internal RAM) 704, a DMAC 705 and an integrated external bus interface 708 are connected to each other through an internal data bus 706 and an internal address bus 707 in the DSP/CPU integrated chip 700. The configuration of FIG. 7 is different from that of FIG. 6 only in that in FIG. 7, the cache (internal RAM) 704 and a cache controller 703 in place of the internal RAM 704 of FIG. 6 are built in the DSP/CPU integrated chip. The DMAC 705 is shown in FIG. 7, but not in FIG. 6, because the DMAC is not required for explanation in FIG. 6. As shown in FIG. 3, the DMAC is built in the DSP/CPU integrated chip. The connection between the cache controller 703 and the DMAC 705, however, is applicable only to FIG. 7.

The access of the DSP/CPU closely-coupling core 701 to an address supported by the cache function is followed by the following-described operations. First, the cache 704 checks to see whether the data of the particular address is contained in the cache 704, and if contained, accesses the data. In the absence of such data, on the other hand, the cache 704 notifies the cache controller 703, which activates the DMAC 705 to read a plurality of neighboring data (500 B to 1 kB in many cases) including the particular data from the external memories 713, 714 into the cache 704. These data are supplied to the DSP/CPU closely-coupling core 701.

The reference to programs and data has a locality. In other words, when a given address is referenced, the possibility of the neighboring addresses being next addressed is very high. The use of a mechanism having a cache as described above, therefore, makes it possible to access the external memories 713, 714 at the same average rate as an internal memory. Such a cache is disclosed in, for example, "Super RISC Engine SH7604 Hardware Manual", First Edition, September 1994, issued by Hitachi Ltd. In the cache memory for the microprocessor described in this manual, however, the amount of data read from an external memory in the absence of corresponding data (miss-hit) in the cache memory is as small as 16 B (bytes) per line of the cache memory.

As described above, the problem of slow access to an external memory for the DSP function is solved by replacing the internal RAM of the DSP/CPU integrated chip by a cache memory.

Third Embodiment

Program Arrangement

Now, a third embodiment of the invention will be described with reference to FIGS. 5, 6, 8 and 9. According to the third embodiment, the problem of slow access to the external memory by the DSP function is obviated by considering the memory assignment.

FIG. 6 shows the detailed relation between the DSP/CPU integrated chip, the internal memory and the external memory of the mobile communication terminal shown in FIG. 5. As already explained with reference to FIG. 6, the DSP/CPU closely-coupling core 601 is integrated as a single bus master. The DSP function and the CPU function can, therefore, both arbitrarily access any of the internal ROM 602, the internal RAM 903, the external ROM 611 and the external RAM 612. In other words, the internal memories and the external memories cannot be distinguished for use with DSP or CPU and constitute completely common resources.

Figure 8:
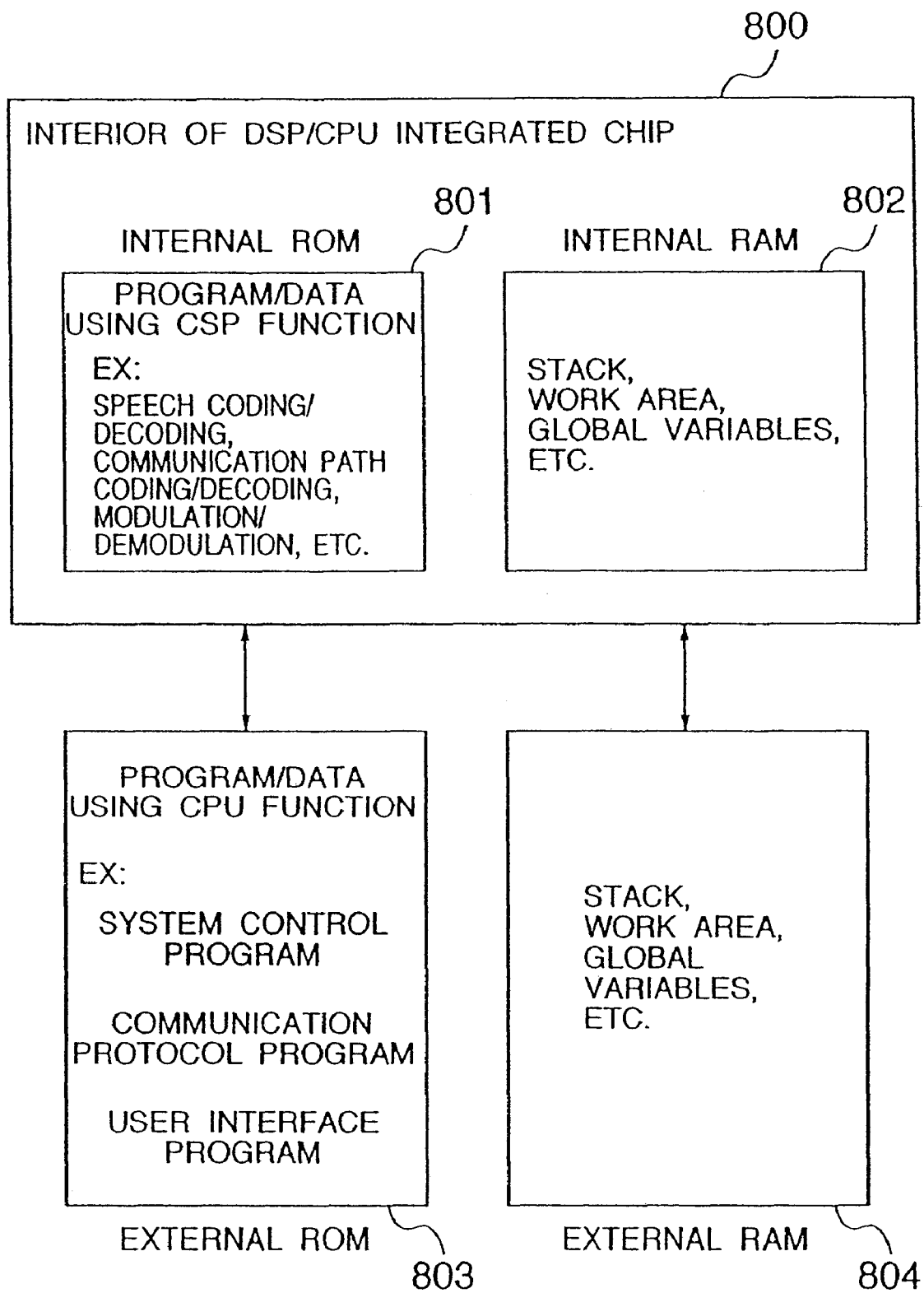
FIG. 8 is a diagram showing a basic form of memory assignment in an application of a mobile communication terminal according to a third embodiment of the invention.

When considering applications to a mobile communication terminal, however, it is important to consciously distinguish the use of the internal memory from that of the external memory. An example of the internal and external memories differently used is shown in FIG. 8, and includes a DSP/CPU integrated chip 800, an internal ROM 801, an internal RAM 602, an external ROM 803 and an external RAM 804. These component parts correspond to the DSP/CPU integrated chip 600, the internal ROM 602, the internal RAM 603, the external ROM 611 and the external RAM 612, respectively, in FIG. 6. In the memory arrangement of FIG. 8, programs using the DSP function such as speech coding/decoding, channel coding/decoding and modulation/demodulation and the constant data for the programs are arranged in the internal ROM 801, while programs using the CPU function such as system control, communication protocol and user interface and the constant data for the programs are arranged in the external ROM 803.

This program arrangement makes it unnecessary for the DSP function to access an external memory, and thereby obviates the problem.

Figure 9:
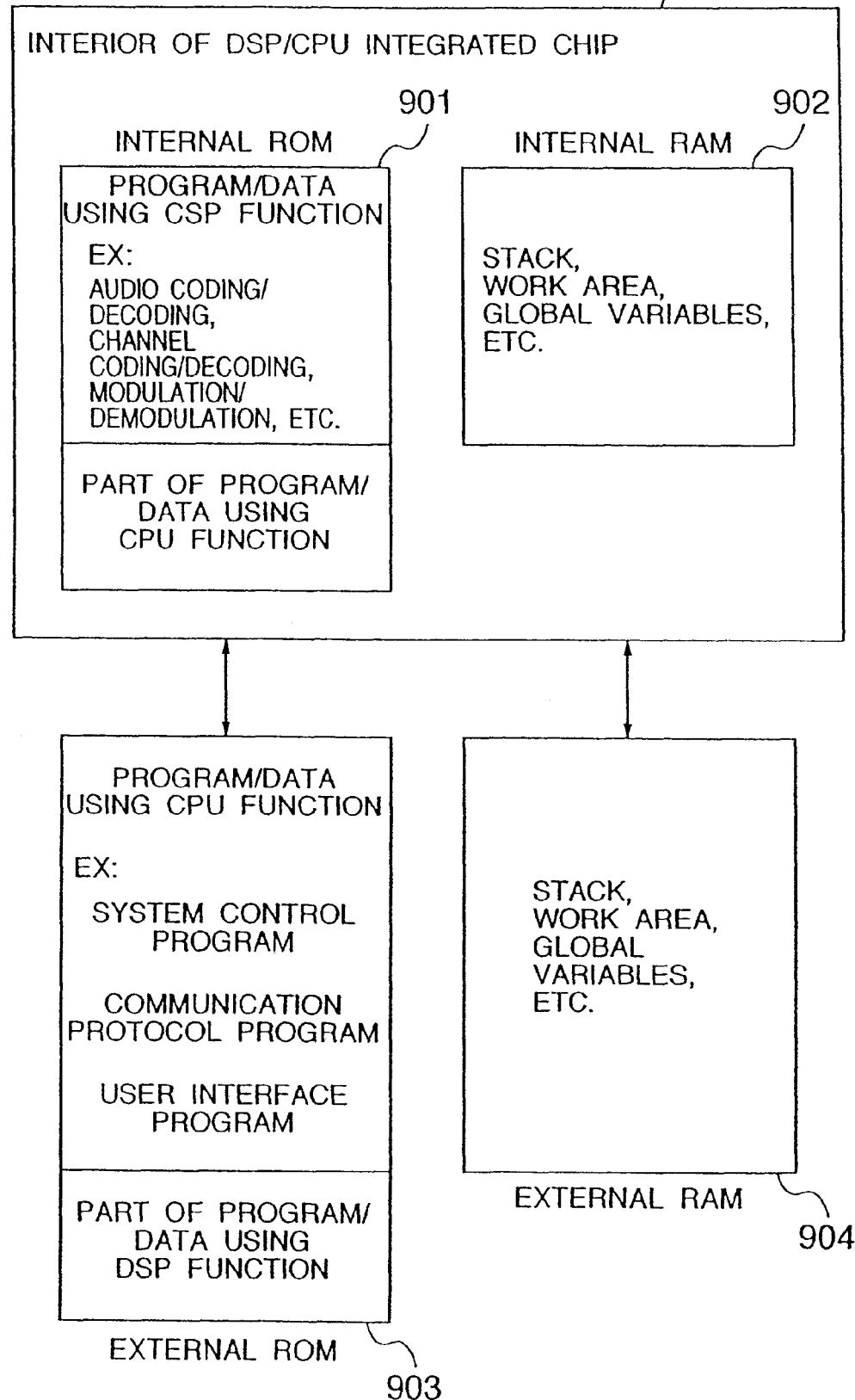
FIG. 9 is a diagram showing an enlarged form of memory assignment in an application of a mobile communication terminal according to the third embodiment of the invention.

Nevertheless, there may be a case in which a program using the DSP function and the constant data for the program are too large to be stored in the internal ROM 801. In such a case, the memory assignment shown in FIG. 9 is effective. FIG. 9 shows a DSP/CPU integrated chip 900, an internal ROM 901, an internal RAM 902, an external ROM 903 and an external RAM 904. These component parts correspond to the DSP/CPU integrated chip 600, the internal ROM 602, the internal RAM 603, the external ROM 611 and the external RAM 612, respectively, in FIG. 6. The memory arrangement in FIG. 9, which is basically the same as the assignment shown in FIG. 8, is different from the latter in that in FIG. 9, the portions of the programs using the DSP functions such as speech coding/decoding, channel coding/decoding and modulation/demodulation and the constant data for the programs that require no high-speed access are arranged in the external ROM 903.

A code table as large as 10 Kbytes is searched, for example, in speech coding. In the process, codes are read from the code table and processed one by one. This process may take several hundred cycles per code. In the case where the large code table of about 10 Kbytes is placed in an external memory, the overhead is as small as several % although the access thereto requires several cycles. Also, all the programs using the DSP functions such as speech coding/decoding, channel coding/decoding and modulation/demodulation do not always involve the Multiply and Add operation, but include some programs using a function similar to what is called the housekeeping process. Such a program is generally accompanied by a small amount of processing and is large in size. Such program portions are preferably arranged in the external ROM 903.

The problem of slow access to an external memory for the DSP functions is solved by arranging in the external ROM the portions of the programs using the DSP functions and the constant data for the programs requiring no high-speed access, as shown in FIG. 9.

Fourth Embodiment

High-Speed Access Mode Memory Interface

Now, a fourth embodiment of the invention will be described with reference to FIGS. 5, 10A, 10B and 11. The fourth embodiment refers to the case in which a memory supporting high-speed access mode not used in the conventional DSP is directly connected as an external memory for the DSP/CPU integrated chip of the first and second embodiments.

There are a number of memories supporting a high-speed access mode. Specifically, an example will be explained in which a burst ROM is directly connected. This invention, however, is not limited to the burst ROM but covers all the memories (synchronous DRAM, synchronous SRAM, etc.) supporting a high-speed access mode. Also, the external address described as 20 bits and the external data described as 8 bits in FIG. 10A are for facilitating the explanation, and the invention is applicable to all the bit widths of the external address and all the bit widths of the external data with equal effect.

Figure 10A:
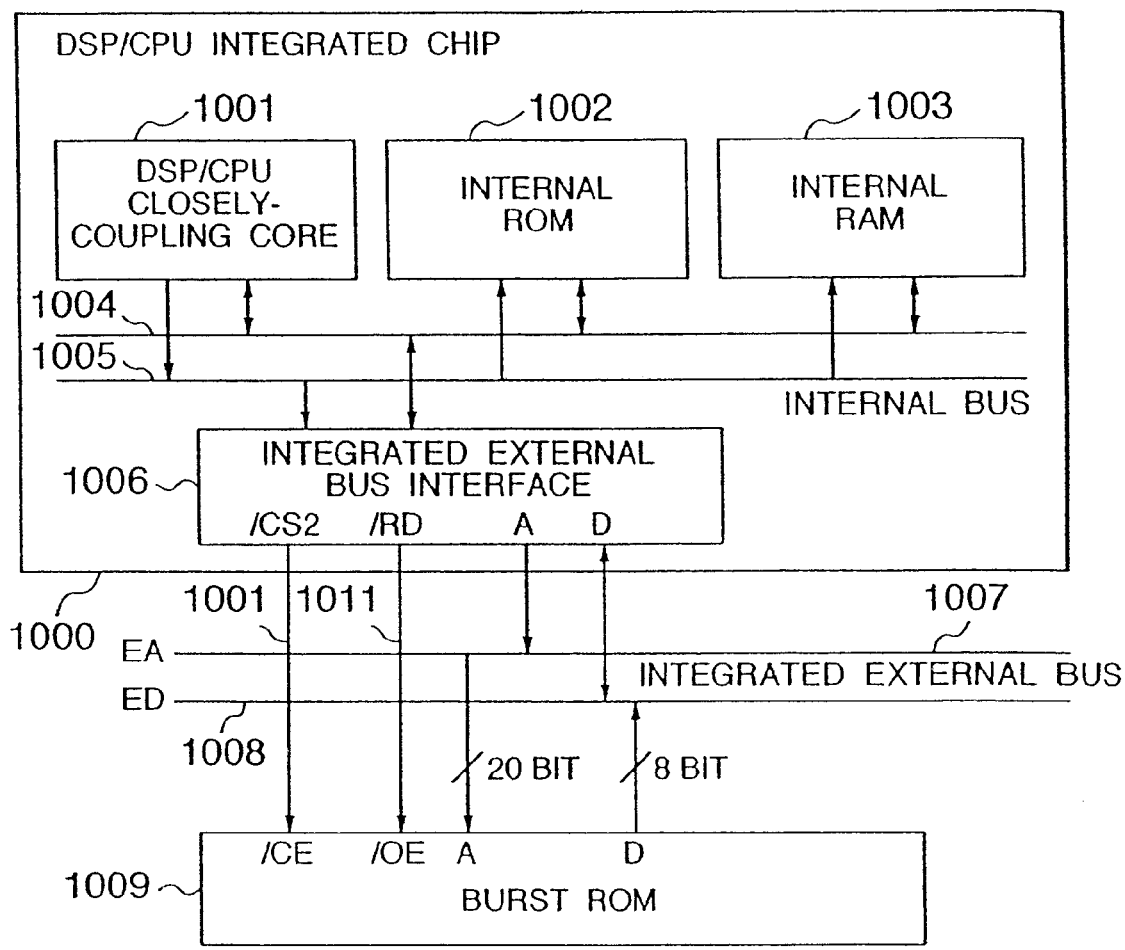
FIGS. 10A, 10B are a connection diagram and a time chart, respectively, for a DSP/CPU integrated chip with a burst ROM directly connected according to a fourth embodiment of the invention.

FIG. 10A shows a detailed case in which a DSP/CPU integrated chip in a mobile communication terminal and a external burst ROM in FIG. 5 are connected to each other. In FIG. 10A, a DSP/CPU integrated chip 1000 and an external burst ROM 1009 are directly connected to each other through an integrated external address bus 1007 and a data bus 1008. These component parts correspond to the DSP/CPU integrated chip 1100, the external ROM 1111, the external address bus 1109 and the data bus 1110, respectively, in FIG. 11. FIG. 10A also shows the manner in which a DSP/CPU closely-coupling core 1001, an internal ROM 1002, an internal RAM 1003 and an integrated external bus interface 1006 are connected to each other through an internal data bus 1004 and an internal address bus 1005 in the DSP/CPU integrated chip 1000. These component parts correspond to the DSP/CPU closely-coupling core 601, the internal ROM 602, the internal RAM 603, the integrated external bus interface 606, the internal data bus 604 and the internal address bus 605, respectively, in FIG. 6. Signals for controlling the external burst ROM 1009 from the DSP/CPU integrated chip 1000 include a chip select signal (/CS2) 1010 and a read signal (/RD) 1011. These signals are applied to a chip enable terminal (/CE) and an output enable terminal (/OE) of the burst ROM 1009. Also, FIG. 10B shows a time chart of signals between the DSP/CPU integrated chip 1000 and the external burst ROM 1009.

Figure 11:
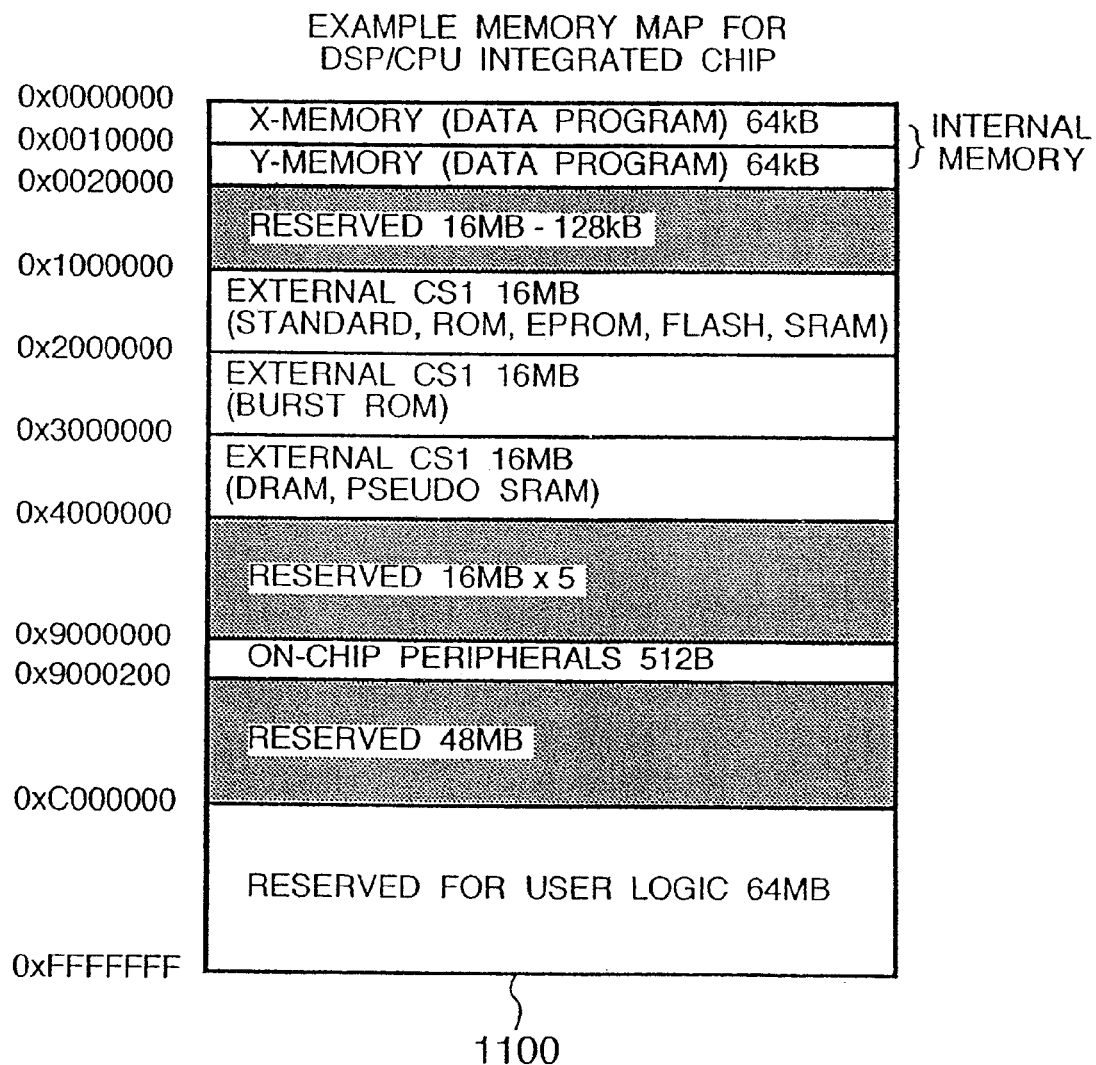
FIG. 11 is a diagram showing an example of a memory map of a DSP/CPU integrated chip.

FIG. 11 shows an example memory map 1100 for the DSP/CPU integrated chip. In this memory map 1100, the burst ROM can be directly connected to the space of the chip select signal (/CS2) 1010. Specifically, when the space of the chip select signal (/CS2) is accessed by the DSP/CPU closely-coupling core 1001 of FIG. 10A, the chip select signal (/CS2) 1010 becomes an active low, and the read signal (/RD) 1011 performs the operation as shown in the time chart.

In the case where four successive data are accessed in the burst ROM, the access to the first data has some overhead but the remaining three data can be accessed at high speed. This condition will be explained with reference to FIG. 10B. Suppose that the chip select signal (/CS2) 1010 becomes low and the burst ROM 1009 becomes active. Four successive data are accessed at a time in the burst ROM using the high-order bits A2 to A19 (except for the two low-order bits) of the address. After that, the four data accessed are read out of the burst ROM sequentially using the two low-order bits A0, A1 of the address. The data thus read out are read into the DSP/CPU integrated chip 1000 at the leading edge of the read signal (/RD) 1011.

Figure 10B:
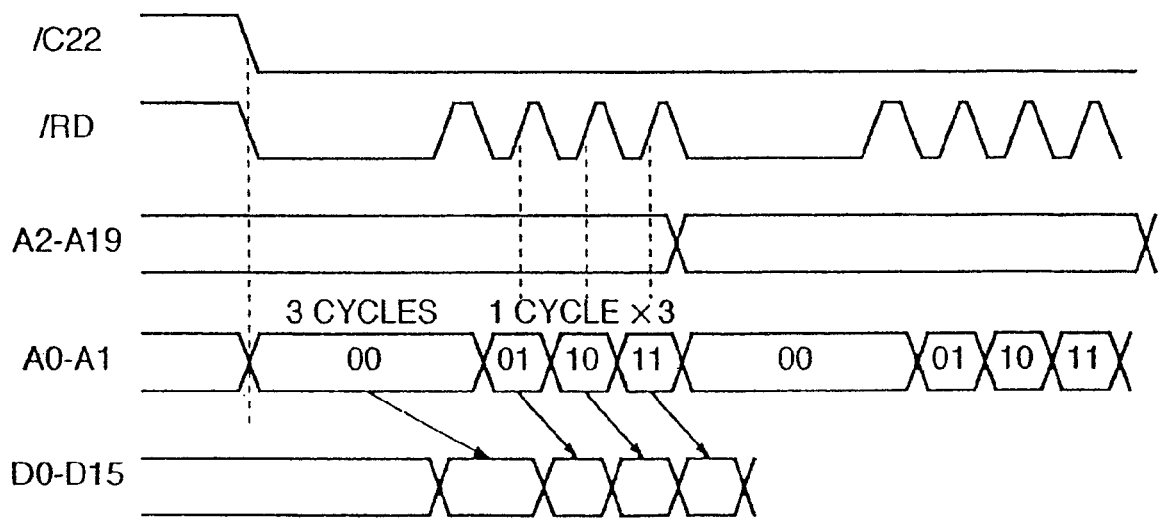

In the example of FIG. 10B, it takes 6 cycles to read the first data. This is because it includes the time required for accessing the four successive data in the burst ROM at a time as described above. The subsequent three data, however, are read out in one cycle. The effective access cycle, therefore, is given as $(6+1*3)/4=2.25$ cycles. This indicates that the access speed is higher by 25% than when 3 cycles are required with an ordinary external ROM.

The problem of slow access to an external memory for the DSP function can thus be solved by directly coupling a memory supporting a high-access mode. Also, the overhead generated when a cache memory fails to hit can be reduced by combining the fourth embodiment with the second embodiment using a cache memory.

Fifth Embodiment

DRAM Interface

Now, a fifth embodiment of the invention will be explained with reference to FIGS. 5, 11 12A, 12B and 12C. The fifth embodiment represents the case in which a DRAM not used in the conventional DSP is directly connected as an external memory for the DSP/CPU integrated chip of the first and second embodiments.

Figure 12A:
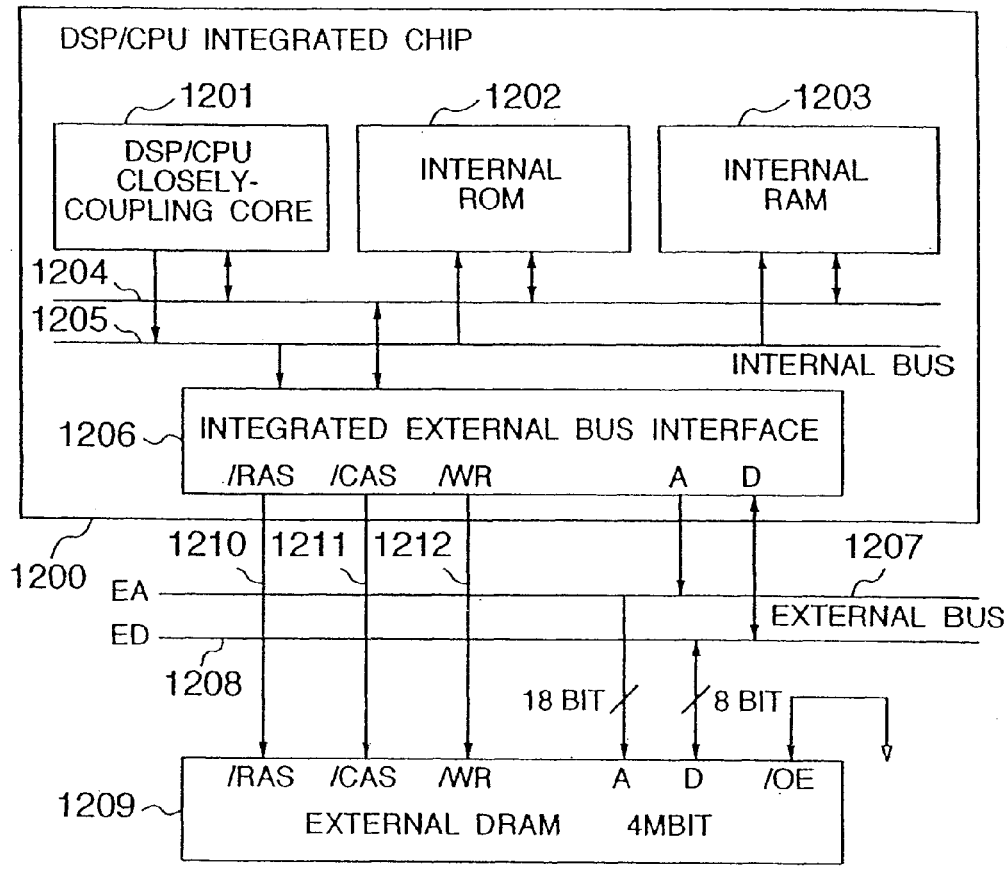
FIGS. 12A, 12B, 12C are a connection diagram and a time charts, respectively, for a DSP/CPU integrated chip with a DRAM directly connected according to a fifth embodiment of the invention.
Figure 12B:
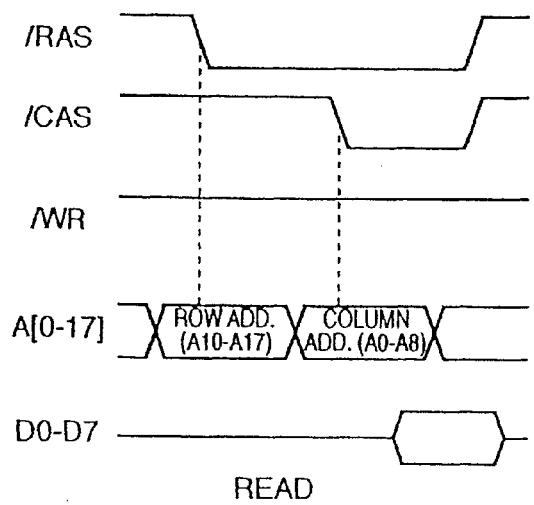
Figure 12C:
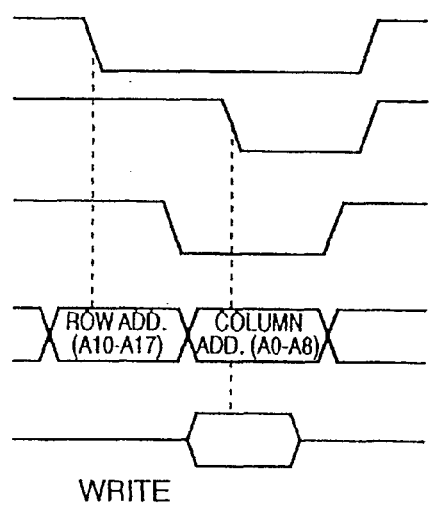

FIG. 12A shows the case in which a DRAM (dynamic RAM) is connected directly as an external RAM to provide a value-added service to a mobile communication terminal. FIG. 12A also shows the detailed case in which the DSP/CPU integrated chip and the external DRAM are connected to each other in the mobile communication terminal of FIG. 5. In FIG. 12A, a DSP/CPU integrated chip 1200 and an external DRAM 1209 are directly connected to each other through an integrated external address bus 1207 and a data bus 1208. These component parts correspond to the DSP/CPU integrated chip 600, the external RAM 612, the external address bus 609 and the data bus 610, respectively, in FIG. 6. FIG. 12A also shows the manner in which a DSP/CPU closely-coupling core 1201, an internal ROM 1202, an internal RAM 1203 and an integrated external bus interface 1206 are connected to each other through an internal data bus 1204 and an internal address bus 1205 in the DSP/CPU integrated chip 1200. These component parts correspond to the DSP. closely-coupling core 601, the internal ROM 602, the internal RAM 603, the integrated external bus interface 606, the internal data bus 604 and the internal address bus 605, respectively, in FIG. 6. Signals for controlling the external DRAM 1209 from the DSP/CPU integrated chip 1200 include a row address select signal (/RAS) 1210, a column address select signal (/CAS) 1211 and a write signal (/WR) 1212. These signals are applied to corresponding pins of the external DRAM 1209, respectively. FIGS. 12B, 12C show time charts of signals between the DSP/CPU integrated chip 1200 and the external DRAM 1209.

An example memory map 1100 for the CSP/CPU integrated chip is shown in FIG. 11. In this memory map 1100, a DRAM can be directly coupled to the space of the chip select signal (/CS3). Specifically, when the space of the chip select signal (/CS3) is accessed by the DSP/CPU closely-coupling core 1201 of FIG. 12A, the row address select signal (/RAS) 1210, the column address select signal (/CAS) 1211 and the write signal (/WR) 1212 perform the operation shown in the time charts of FIGS. 12B, 12C.

According to this invention, a large-capacity DRAM directly coupled in this manner can be directly accessed from the DSP function. The mobile communication terminal as shown in FIG. 5 can be easily equipped with a value-added service such as the voice mail function. The audio data communicated in the mobile communication terminal is compressed to 4 kbits/sec to 13 kbits/sec. In the case where one DRAM chip of 4 Mbits is used as shown in FIG. 12A, for example, a voice signal of 5 to 17 minutes can be stored.

Sixth Embodiment

Higher Data Transfer Rate of Peripheral Circuits

Now, a sixth embodiment of the invention will be explained with reference to FIGS. 5, 13A, 13B and 14. The sixth embodiment is intended to improve the data transfer speed of the integrated peripheral circuits of the first embodiment.

The conventional independent DSP chip, in which peripheral circuits are few in number and types and are directly connected to an internal data bus, is capable of high-speed data transfer. The conventional independent CPU chip, on the other hand, has many peripheral circuits of various types. The resulting requirement of a peripheral circuit interface, however, leads to a low data transfer rate.

With the DSP/CPU integrated chip according to this invention, the peripheral circuits for the DSP function are connected to the peripheral circuits of the CPU function through an integrated peripheral circuit interface. As a result, a low data transfer rate is caused sometimes for the peripheral circuits of the DSP function.

In view of this, according to the sixth embodiment, a plurality of samples are transferred concurrently to improve the speed of data transfer for the integrated peripheral circuits of the first embodiment.

Figure 13A:
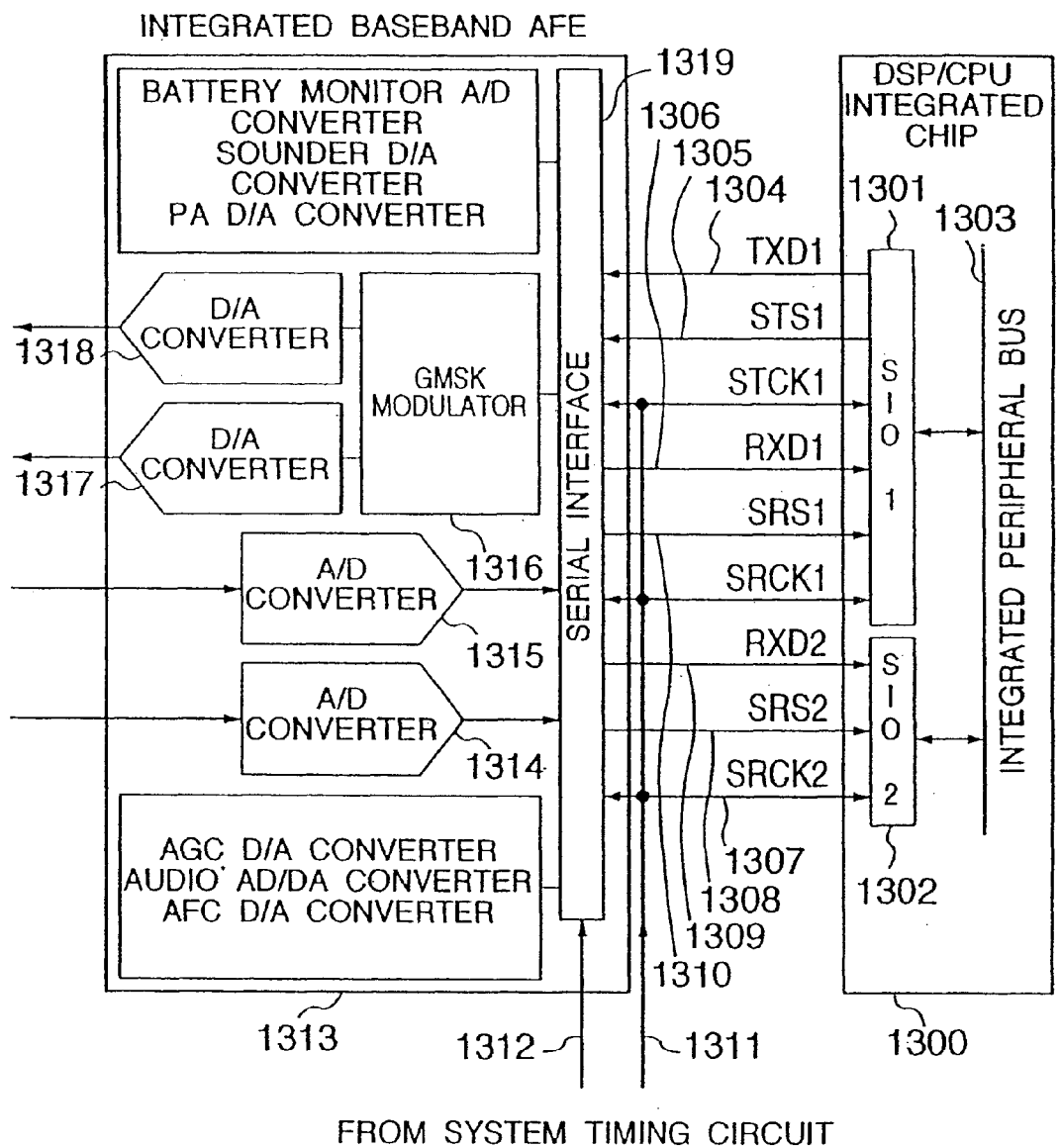
FIGS. 13A, 13B are a connection diagram and a time chart, respectively, for a DSP/CPU integrated chip and an I/Q signal AD/DA converter according to a sixth embodiment of the invention.

FIG. 13 shows in detail the connection between the DSP/CPU integrated chip 1300 and the integrated baseband AFE 1313 in the mobile communication terminal of FIG. 5. These component parts correspond to the DSP/CPU integrated chip 500 and the integrated AFE 501, respectively, in FIG. 5. FIG. 13A shows, in particular, only the portions of data transfer for exchanging data with a RF modem.

A serial input-output circuit (SI01) 1301, a serial input-output circuit (SI02) 1302 and an integrated peripheral bus 1303 are involved in the DSP/CPU integrated chip 1300. These component parts correspond to the DSP peripheral circuit 322, the integrated peripheral address bus (PA) 320 and the integrated peripheral data bus (PD) 321, respectively, in FIG. 3. Although the serial input-output circuit (SI01) 1301 is used for both input and output functions in FIG. 13A, the serial input-output circuit (SI02) 1302 is used only for the input functions. In other words, the DSP/CPU integrated chip 1300 is configured to have one output and two inputs with respect to the integrated baseband AFE 1313.

The component elements of the integrated baseband AFE 1313 related to this embodiment include a serial interface 1319, a GMSK (Gaussian minimum shift keying) modulator 1316, an I signal D/A converter 1318, a Q signal D/A converter 1317, an I signal A/D converter 1315, and a Q signal A/D converter 1314. The RF modem and the integrated baseband AFE 1313 exchange data by means of the I and Q analog signals.

Figure 13B:
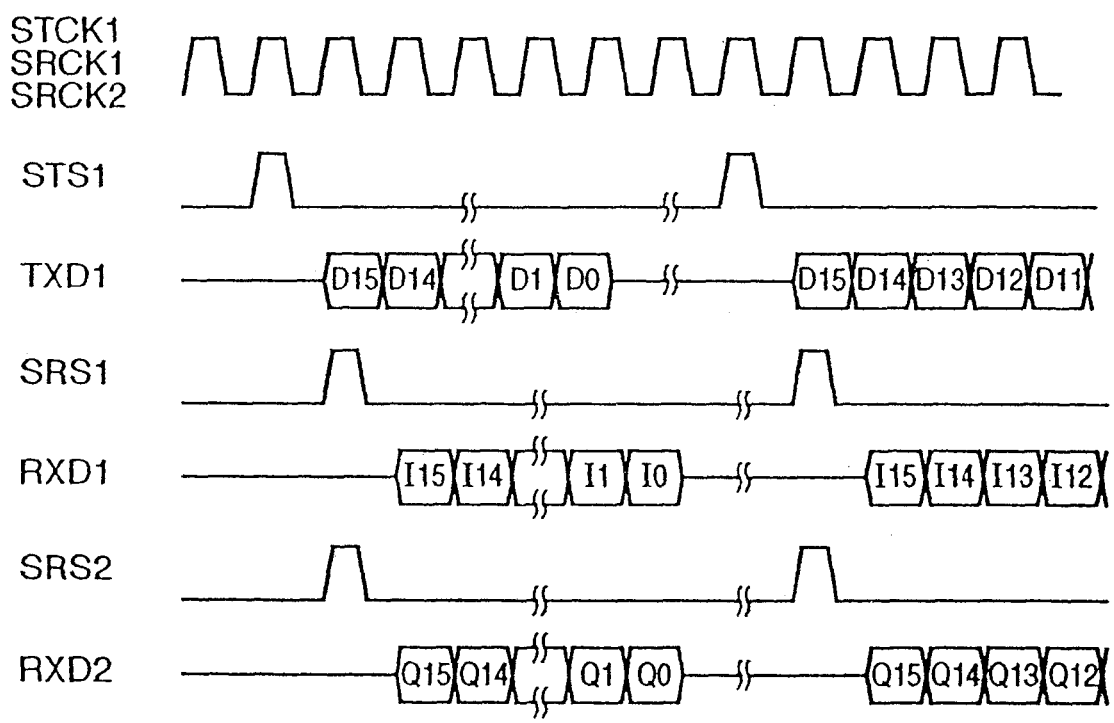

The DSP/CPU integrated chip 1300 and the integrated baseband AFE 1313 are connected to each other through signal lines (TXD1) 1304, (STS1) 1305, (STCK1) 1311, (RXD1) 1306, (SRS1) 1310, (SRCK1) 1311, (RDX2) 1309, (SRS2) 1308 and (SRCK2) 1311. A timing chart of these signal lines is shown in FIG. 13B. The signals on the signal lines 1311 and 1312 in FIG. 13A are supplied from the system timing circuit 20 in FIG. 5. The signal line 1312 is used for controlling the serial interface 1319. The signal line 1311 is for carrying a basic clock for data transfer, which is supplied to both the DSP/CPU integrated chip 1300 and the integrated baseband AFE 1313.

Now, the transfer will be explained in detail. First, consider the case in which data are transferred from the DSP/CPU integrated chip 1300 to the integrated baseband AFE 1313. In the process, the three signal lines (TXD1) 1304, (STS1) 1305 and (STCK1) 1311 are used. The signal line (STCK1) 1311 represents a basic clock for data transfer supplied from the system timing circuit 520 of FIG. 5 as described above. In this case, 16-bit digital data are transferred bit by bit in synchronism with the basic clock. Data having an arbitrary bit width can of course be transferred in the same manner. The signal line (TXD1) 1304 represents a one-bit data bus for transmission. The signal line (STS1) 1305 represents a frame sync signal line. The data are output sequentially bit by bit on the signal line (TXD1) 1304 during the 16 clocks starting with the clock immediately following the pulse output of this signal. The timing involved is shown in FIG. 13B. Starting with the clock immediately following the pulse output on the signal line (STS1) 1305, 16-bit data D15 to D0 are output on the signal line (TXD1) 1304 bit by bit for each clock sequentially from the most significant bit D15.

Now, consider the case in which the DSP/CPU integrated chip 1300 receives data from the integrated baseband AFE 1313. Two signal data including the I and Q signals are received. First, consider the I signal. Three signal lines are used, including the signal lines (RXD1) 1306, (SRS1) 1310 and (SRCK1) 1311. The signal line (SRCK1) 1311, as described above, represents a basic clock for data transfer supplied from the system timing circuit 520 shown in FIG. 5. The 16-bit digital data are transferred bit by bit in synchronism with the basic clock. Data of a given bit width can of course be transferred in the same manner. The signal line (RXD1) 1306 represents a one-bit data bus for receiving. The signal line (SRS1) 1310 represents a frame sync signal line. The data on the signal line (RXD1) 1304 are input bit by bit sequentially during the 16 clocks starting with the clock immediately following the input of the pulse signal on the line (SRS1) 1310 to the DSP/CPU integrated chip 1300. The timing involved is also shown in FIG. 13B. The 16-bit data D15 to D0 from the clock immediately following the pulse input to the signal line (SRS1) 1306 are input bit by bit from the signal line (RXD1) 1304 for each clock sequentially starting with the most significant bit D15. The Q signal is also received exactly the same manner as the I signal. The difference line in that the I signal is received by the serial input-output circuit (SI01) 1301 and the Q signal by the serial input-output circuit (SI02) 1302.

Figure 14:
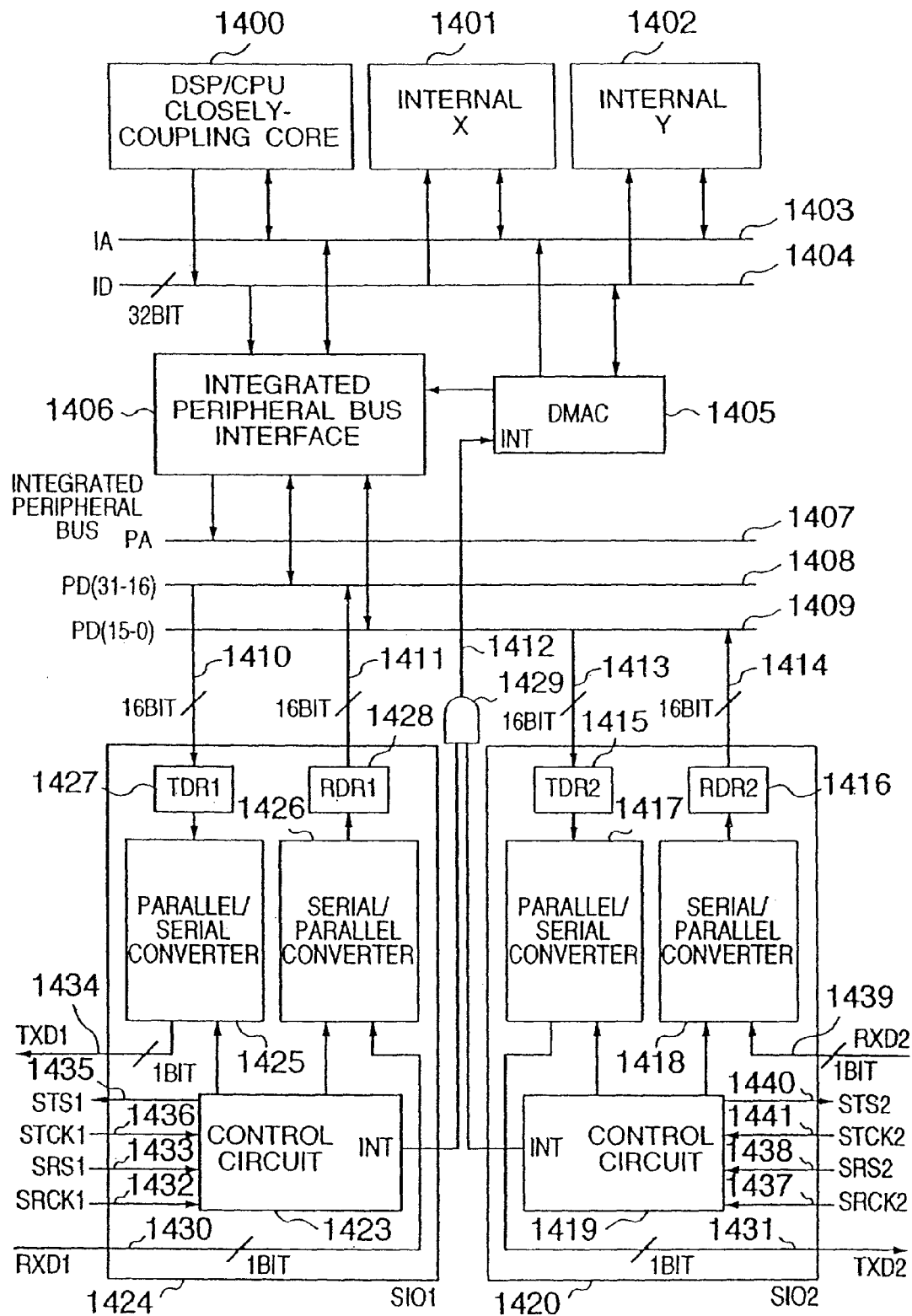
FIG. 14 is a diagram showing a configuration of a serial input-output circuit according to the sixth embodiment of the invention.

Now, the serial input-output circuit (SI01) 1301 and the serial input-output circuit (SI02) 1302 will be explained in detail with reference to FIG. 14. FIG. 14 shows the portion of the DSP/CPU integrated chip related to the present embodiment. The serial input-output circuit (SI00) 1301 corresponds to the serial input-output circuit (SI01) 1424, and the serial input-output circuit (SI02) 1302 to the serial input-output circuit (SI02) 1420.

The configuration of FIG. 14 includes a DSP/CPU closely-coupling core 1400, an internal memory X 1401, an internal memory Y 1402, an integrated peripheral bus interface 1406, a DMAC 1405, a serial input-output circuit (SI01) 1424, a serial input-output circuit (SI02) 1420, and an AND circuit 1429. The DSP/CPU closely-coupling core 1400, the internal memory X 1401, the internal memory Y 1402, the integrated peripheral bus interface 1406 and the DMAC 1405 are connected to each other through the internal address bus (IA) 1403 and the internal data bus (ID) (32 bits wide) 1404. The serial input-output circuit (SI01) 1424 and the serial input-output circuit (SI02) 1420 are connected to the integrated peripheral bus interface 1406 through the integrated peripheral buses 1407, 1408, 1409.

The integrated peripheral bus includes an address bus (PA) 1407 and a 32-bit wide data bus (PD). The PD bus in turn includes a 16 high-order bit PD (31 to 16) 1408 and a 16 low-order bit PD (.to 0) 1409. In FIG. 14, the serial input-output circuit (SI01) 1424 is connected to the 16 high-order bit PD (-to 16) 1408 of the integrated peripheral data bus, and the serial input-output circuit (SI02) 1420 to the 16 low-order bit PD (15 to 0) 1409 of the integrated peripheral data bus. Though not shown, the address bus (PA) 1407 is connected to the serial input-output circuit (SI01) 1424 and the serial input-output circuit (SI02) 1420.

The serial input-output circuit (SI01) 1424 includes a 16-bit wide data transmission data register (TDR1) 1427, a 16-bit wide data receiving data register (RDR1) 1428, a parallel/serial converter 1425, a serial/parallel converter 1426 and a control circuit 1423. Six signal lines (three each for transmission and receiving) (RXD1) 1430, (SRCK1) 1432, (SRS1) 1433, (TXD1) 1434, (STS1) 1435 and (STCK1) 1436 are also shown for exchanging data with circuits external to the chip. These signal lines correspond to the signal lines (RXD1) 1306, (SRCK1) 1311, (SRS1) 1310, (TXD1) 1304, (STS1) 1305 and (STCK1) 1311, respectively, in FIG. 13A. These signal lines are described above in detail with reference to FIG. 13A.

The serial input-output circuit (SI02) 1420 includes a 16-bit wide data transmission data register (TDR2) 1415, a 16-bit wide data receiving data register (RDR2) 1416, a parallel/serial converter 1417, a serial/parallel converter 1418 and a control circuit 1419. Six (three each for transmission and receiving) signal lines (TXD2) 1431, (SRCK2) 1437, (SRS2) 1438, (RXD2) 1439 are also shown for exchanging data with circuits external to the chip. Among these signal lines, the signal lines (SRCK2) 1437, (SRS2) 1438 and (RXD2) 1439 correspond to (SRCK2) 1307, (SRS2) 1308 and (RXD2) 1309, respectively, in FIG. 13A. These signal lines are also described above in detail with reference to FIG. 13A. In FIG. 13A, however, the serial input-output circuit (SI02) 1420 is used only for receiving. Consequently, the three transmission signal lines (TXD2) 1431, (STS2) 1440 and (STCK2) 1441 are not shown in FIG. 13A.

First, explanation will be made about the data transmission using the serial input-output circuit (SI01) 1424. The 16-bit wide transmission data are applied to the data transmission data register (TDR1) 1427 through the 16 high-order bit PD (-to 16) 1408 of the integrated peripheral data bus. The data are further output bit by bit on the one-bit data bus (TDX1) 1434 through the parallel/serial converter 1425. The output cycle and timing are controlled by the control circuit 1423 using the signal line (STS1) 1435 and (STCK1) 1436.

Now, explanation will be made about the case in which the two 16-bit data received by the serial input-output circuit (SI01) 1424 and the serial input-output circuit (SI02) 1420 are transferred through a 32-bit bus. The serial input-output circuit (SI01) 1424 is supplied with the receiving data bit by bit from the signal line (RDX1) 1430. The input cycle and timing are controlled by the control circuit 1423 using the signal lines (SRS1) 1433 and (SRCK1) 1432. The bit string thus input is converted into a 16-bit wide parallel data through the serial/parallel converter 1426, and input to the receiving data register 1428. When the receiving data register 1428 is supplied with the receiving data and preparations are made for transfer, then the control circuit 1423 activates the interrupt signal (INT) 1422 to DMAC.

The serial input-output circuit (SI02) 1420, on the other hand, is supplied with the receiving data bit by bit from the signal line (RDX2) 1439. The input cycle and timing are controlled by the control circuit 1419 using the signal lines (SRS2) 1438 and (SRCK2) 1437. The bit string thus input is converted into a 16-bit wide parallel data through the serial/parallel converter 1418, and applied to the receiving data register (RDR2) 1416. When the receiving data register (RDR2) 1416 is supplied with the receiving data and preparations are made for transfer, the control circuit 1419 activates the interrupt signal (INT) 1421 to the DMAC. The AND circuit 1429 produces the logical product of the interrupt signal (INT) 1422 and the interrupt signal (INT) 1421 thereby to interrupt the DMAC 1405. In other words, the data to be transferred are prepared in the two 16-bit receiving data registers (RDR1) 1428 and (RDR2) 1416 by the time when the DMAC 1405 is interrupted. The DMAC can handle the two 16-bit receiving data as a single 32-bit datum, and transfer it to the internal memory X 1401 or the internal memory Y 1402 through the 32-bit wide integrated peripheral data buses 1408, 1409 and the 32-bit wide internal data bus 1404.

In this way, the transfer rate of the serial input-output circuit can be doubled according to the sixth embodiment as compared with the bit-by-bit transfer of the 16-bit data. The problem of slow data transfer of the peripheral circuits for the DSP function can thus be solved.

Seventh Embodiment

Now, a seventh embodiment of the invention will be explained with reference to FIGS. 5, 15A, 15B and 16. The seventh embodiment is a variation of the sixth embodiment. The sixth embodiment uses two serial input-output circuits for two receiving signals. The seventh embodiment, by contrast, uses only one serial output circuit by time division of two receiving signals.

Figure 15A:
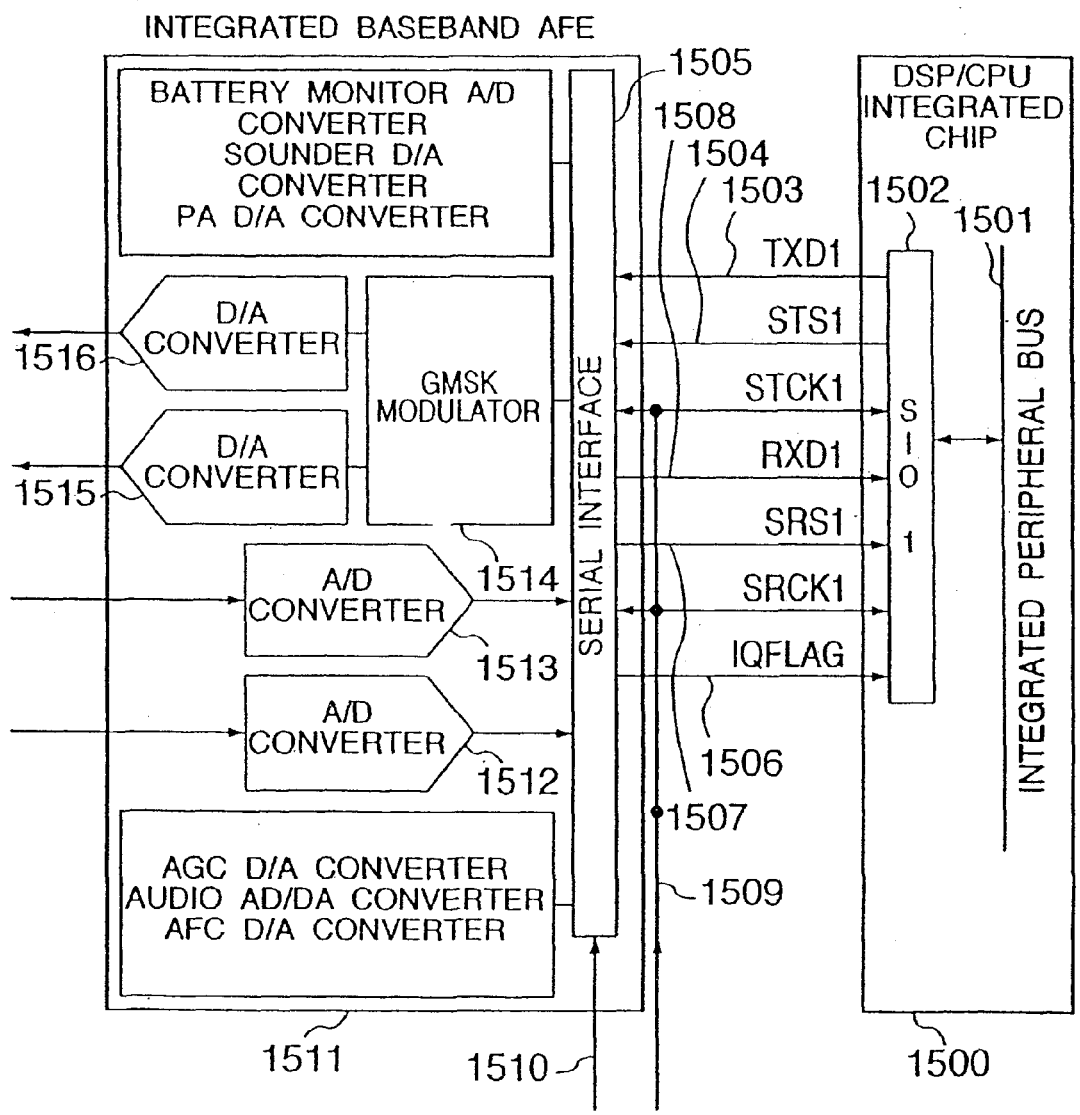
FIGS. 15A, 15B are a connection diagram and a time chart, respectively, for a DSP/CPU integrated chip and an I/Q signal AD/DA converter according to a seventh embodiment of the invention.

FIG. 15A shows in detail the connection between a DSP/CPU integrated chip 1500 and an integrated baseband AFE 1511 in the mobile communication terminal of FIG. 5. These component parts correspond to the DSP/CPU integrated chip 100 and the integrated AFE 501, respectively, in FIG. 5. Only the portions for transferring data relating to data exchange with a RF modem are shown in FIG. 15A.

The serial input-output circuit (SI01) 1502 and the integrated peripheral bus 1501 are involved in the DSP/CPU integrated chip 1500. These component parts correspond to the DSP peripheral circuit 422, the integrated address bus (PA) 320 and the integrated data bus (PD) 321, respectively, in FIG. 3. In FIG. 15A, the serial input-output circuit (SI01) 1502 is used for input and output functions. The DSP/CPU integrated chip 1500 is configured of one output and two inputs with respect to the integrated baseband AFE 1511.

The component elements of the integrated baseband AFE 1511 according to the present embodiment include a serial interface 1505, a GMSK (Gaussian minimum shift keying) modulator 1514, an I signal D/A converter 1516, a Q signal D/A converter 1515, an I signal A/D converter 1513, and a Q signal A/D converter 1512. The RF modem and the integrated baseband AFE 1511 exchange data using the I and Q signals constituting analog signals.

Figure 15B:
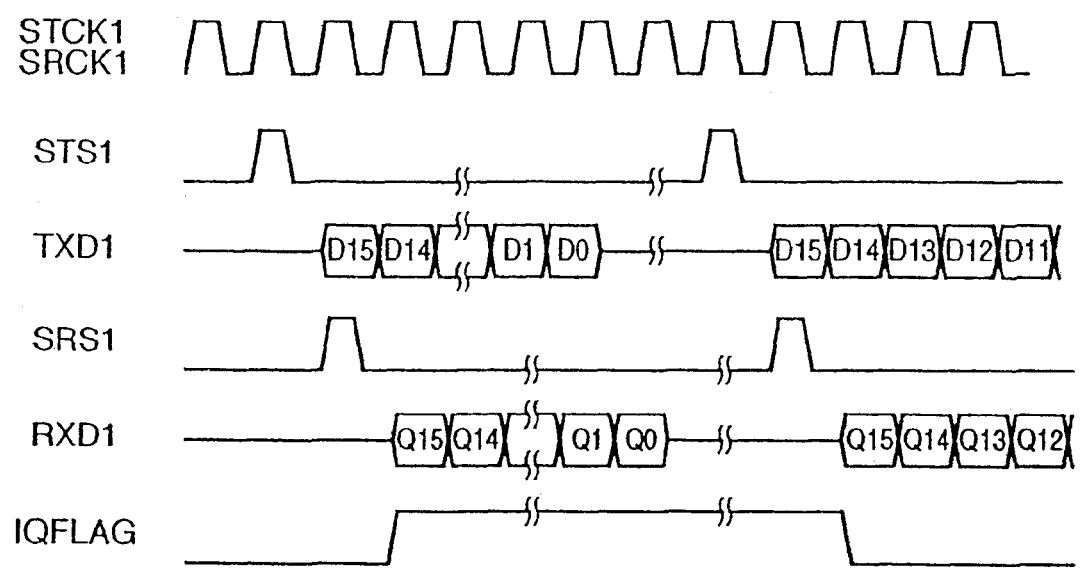

The DSP/CPU integrated chip 1500 and the integrated baseband AFE 1511 are connected to each other through signal lines (TXD1) 1503, (STS1) 1504, (STCK1) 1509, (RXD1) 1508, (SRS1) 1507, (SRCK1) 1509 and (IQFLAG) 1506. A timing chart of these signal lines is shown in FIG. 15B. The signals on the signal line 1509 and the signal line 1510 in FIG. 15A are supplied from the system timing circuit 520. The signal line 1510 is used for controlling the serial interface 1505. The signal line 1509 represents a basic clock for data transfer and is supplied to both the DSP/CPU integrated chip 1500 and the integrated baseband AFE 1511.

Now, the transfer operation will be described in detail. The data transfer from the DSP/CPU integrated chip 1500 to the integrated baseband AFE 1511 is exactly the same as that in the case of FIG. 13A and will not be explained.

Consider the case in which the DSP/CPU integrated chip 1500 receives data from the integrated baseband AFE 1511. Two signal data including I and Q signals are received. FIG. 15A shows the case in which the two signals are time-division multiplexed. At this time, four signal lines (RXD1) 1508, (SRS1) 1507, (SRCK1) 1509 and (IQFLAG) 1506 are used. The signal line (SRCK1) 1509, as described above, represents the basic clock for data transfer supplied from the system timing circuit 520 of FIG. 5. In this case, too, 16-bit digital data are transferred bit by bit in synchronism with the basic clock. Data of an arbitrary bit width can of course be transferred in the same manner. The signal line (RXD1) 1508 is a one-bit data bus for receiving. The signal line (SRS1) 1507 is a frame sync signal line. The data on the signal line (RXD1) 1508 are input sequentially bit by bit during the period of 16 clocks starting with the clock immediately following the time when this signal is input to the DSP/CPU integrated chip 1500 as a pulse.

The timing involved is shown in FIG. 15B. In this timing chart, the I signal is first input, followed by the Q signal. First, the 16-bit data I15 to I0 are sequentially input with the most significant bit I15 first from the signal line (RXD1) 1508 at the rate of one bit per clock starting with the clock immediately following the first pulse of the signal line (SRS1) 1507. Then, the 16-bit data Q15 to Q0 are input the most significant bit Q15 first from the signal line (RXD1) 1508 sequentially at the rate of one bit per clock starting with the clock immediately following the second input pulse of the signal line (SRS1) 1507. The signal line (IQFLAG) 1506 is used in order to identify the data transferred by the signal line (RXD1) 1508. In FIG. 15A, the signal line (IQFLAG) 1506 is kept high during the transfer of the I signal.

Figure 16:
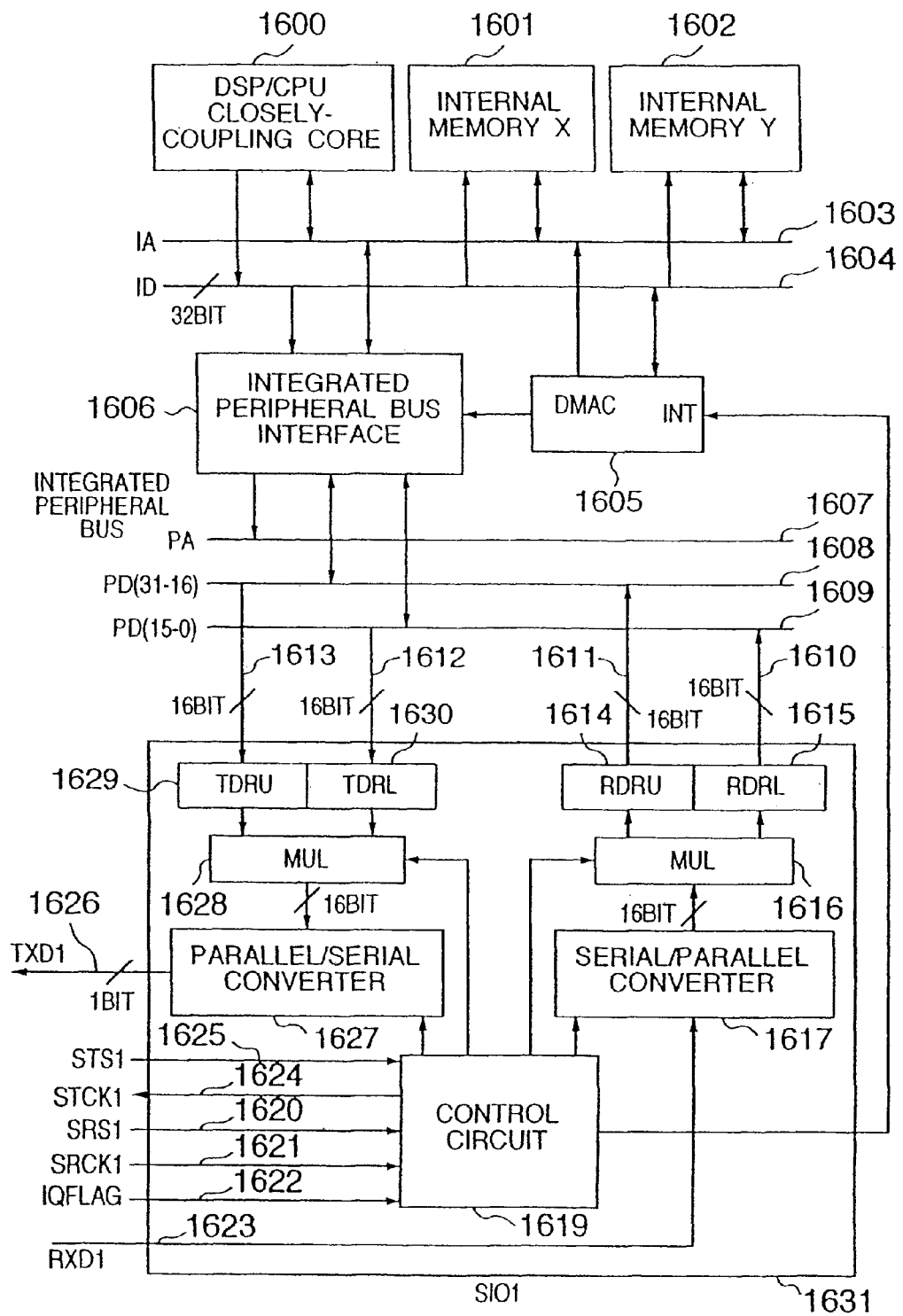
FIG. 16 is a diagram showing a configuration of a serial input-output circuit according to the seventh embodiment of the invention.

Now, the serial input-output circuit (SI01) 1502 in FIG. 15A will be explained in detail with reference to FIG. 16. FIG. 16 shows the portions of the DSP/CPU integrated chip relating to the present embodiment. The serial input-output circuit (SI01) 1502 corresponds to the serial input-output circuit (SI01) 1631.

The configuration of FIG. 16 includes a DSP/CPU closely-coupling core 1600, an internal memory X 1601, an internal memory Y 1602, an integrated peripheral bus interface 1606, a DMAC 1605 and a serial input-output circuit (SI01) 1631. The DSP/CPU closely-coupling core 1600, the internal memory X 1601, the internal memory Y 1602, the integrated peripheral bus interface 1606 and the DMAC 1605 are connected to each other through an internal address bus (IA) 1603 and an internal data bus (ID) (32-bit wide) 1604. The serial input-output circuit (SI01) 1631 is connected to the integrated peripheral bus interface 1606 through the integrated peripheral buses 1607, 1608, 1609. The integrated peripheral bus includes an address bus (PA) 1607 and a 32-bit wide data bus (PD). The PD bus includes the 16 high-order bit PD (-to 16) 1608 and the 16 low-order bit PD (.to 0) 1609.

The serial input-output circuit (SI01) 1631 includes two 16-bit wide data transmission data registers (TDRU) 1629, (TDRL) 1630, two 16-bit wide data receiving data registers (RDRU) 1614, (RDRL) 1615, two multiplexers (MUL) 1628, 1616, a parallel/serial converter 1627, a serial/parallel converter 1617 and a control circuit 1619. The data transmission data register (TDRU) 1629 and the data receiving data register (RDRU) 1614 are connected to the 16 high-order bit PD (-to 16) 1608 of the integrated peripheral data bus. The data transmission data register (TDRL) 1630 and the data receiving data register (RDRL) 1615 are connected to the 16 low-order bit PD (.to 0) 1609 of the integrated peripheral data bus. Seven signal lines for exchanging data with circuits external to the chip are also shown. They include three signal lines (STS1) 1625, (STCK1) 1624 and (TDX1) 1626 for transmission, and four signal lines (SRS1) 1520, (SRCK1) 1621, (RXD1) 1623 and (IQFLAG) 1622 for receiving. These signal lines are explained in detail above with reference to FIG. 15.

First, explanation will be made about the case in which data are transmitted using the serial input-output circuit (SI01) 1631. Two 16-bit wide transmission data are input through a 32-bit integrated peripheral data bus PD (31 to 0) to two 16-bit wide data transmission data registers (TDRU) 1629 and (TDRL) 1630. The data register (TDRU) 1629 is supplied through the 16 high-order bit PD (-to 16) 1608, and the data register (TDRL) 1630 through the 16 low-order bit (.to 0)

1609. Then, the multiplexer 1628 selects which of the data in the two transmission data registers is to be transmitted. The selected 16-bit wide data are output on the 1-bit data bus (TDX1) 1626 bit by bit through the parallel/serial converter 1627. The output cycle and timing are controlled by the control circuit 1619 using the signal lines (STS1) 1625 and (STCK1) 1624.

Now, explanation will be made about the case in which two 16-bit wide data (I signal data and Q signal data) received by the serial input-output circuit (SI01) 1631 are transferred concurrently through a 32-bit bus. The serial input-output circuit (SI01) 1631 is supplied with the receiving data bit by bit from the signal line (RDX1) 1623. The input cycle and timing are controlled by the control circuit 1619 using the signal lines (SRS1) 1620 and (SRCK1) 1621. The bit string thus input are converted into 16-bit wide parallel data through the serial/parallel converter 1617, and are applied to one of the two receiving data registers. The receiving data register to which the signal is input is determined by the multiplexer (MUL) 1616. The multiplexer (MUL) 1616 is switched by a control signal generated by the control circuit 1619 on the basis of the signal line (IQFLAG) 1622. The I signal data are applied to the register (RDRU) 1614 and the Q signal data to the register (RDRL) 1615, for example.

When the receiving data are applied to the two receiving data registers (RDRU) 1614 and (RDRL) 1615 and preparations are made for transfer, then the control circuit 1619 activates an interrupt signal (INT) 1618 to the DMAC thereby to interrupt the DMAC 1605. The DMAC handles two 16-bit receiving data as a single 32-bit data and can transfer it to the internal memory X 1601 or the internal memory Y 1602 through the 32-bit wide integrated peripheral data buses 1608, 1609 and the 32-bit wide internal data bus 1604.

In this way, the transfer rate of the serial input-output circuit can be doubled by using the seventh embodiment as compared with the case in which 16-bit data are transferred one by one, and thus the problem of slow data transfer can be solved for the peripheral circuit of the DSP function.

Eighth Embodiment

Power Amplifier Control

Now, an eighth embodiment of the invention will be explained with reference to FIGS. 2, 5, 17A, 17B, 18, 19, 20A, 20B. In the conventional GSM mobile communication terminal shown in FIG. 2, the low efficiency of the system configuration due to the overhead between DSP and CPU poses the problem. According to the present embodiment, such an overhead is eliminated as the DSP function and the CPU function are integrated with each other as in the first embodiment. Therefore, the mobile communication terminal can be configured efficiently.

Specifically, consider the power amplifier control of the RF section. The mobile communication terminal shown in FIGS. 2 and 5 is responsible for controlling the output of the power amplifier of the RF section on the basis of an instruction from the base station. In the conventional configuration of power amplifier control, the communication overhead often occurs between DSP and CPU.

Figure 1:
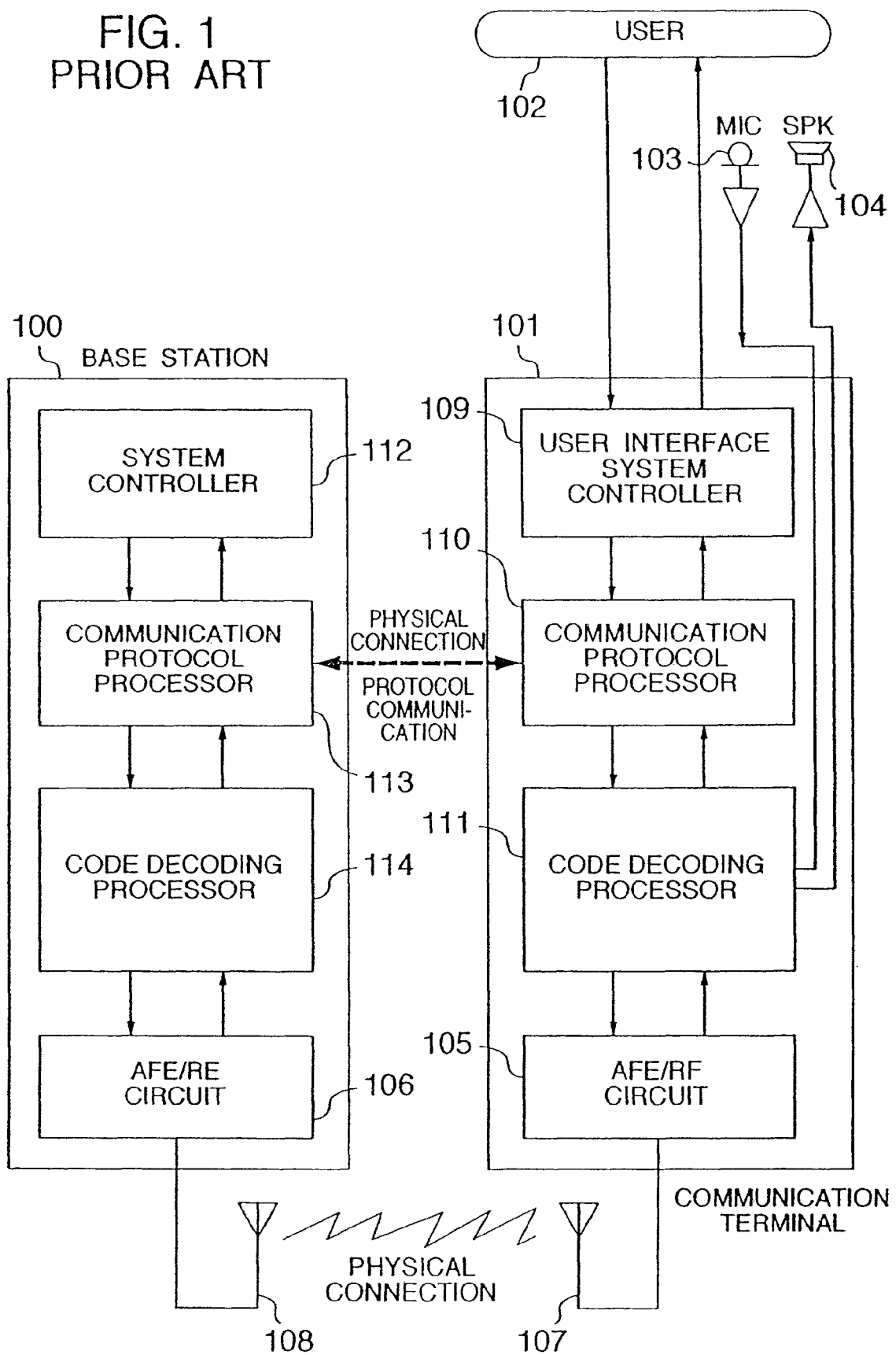
FIG. 1 is a diagram showing a basic configuration of a mobile communication system.

First, the overhead will be briefly explained with reference to FIGS. 1 and 18. The processing at the communication terminal of the mobile communication system is explained already with reference to FIG. 1.

Figure 18:
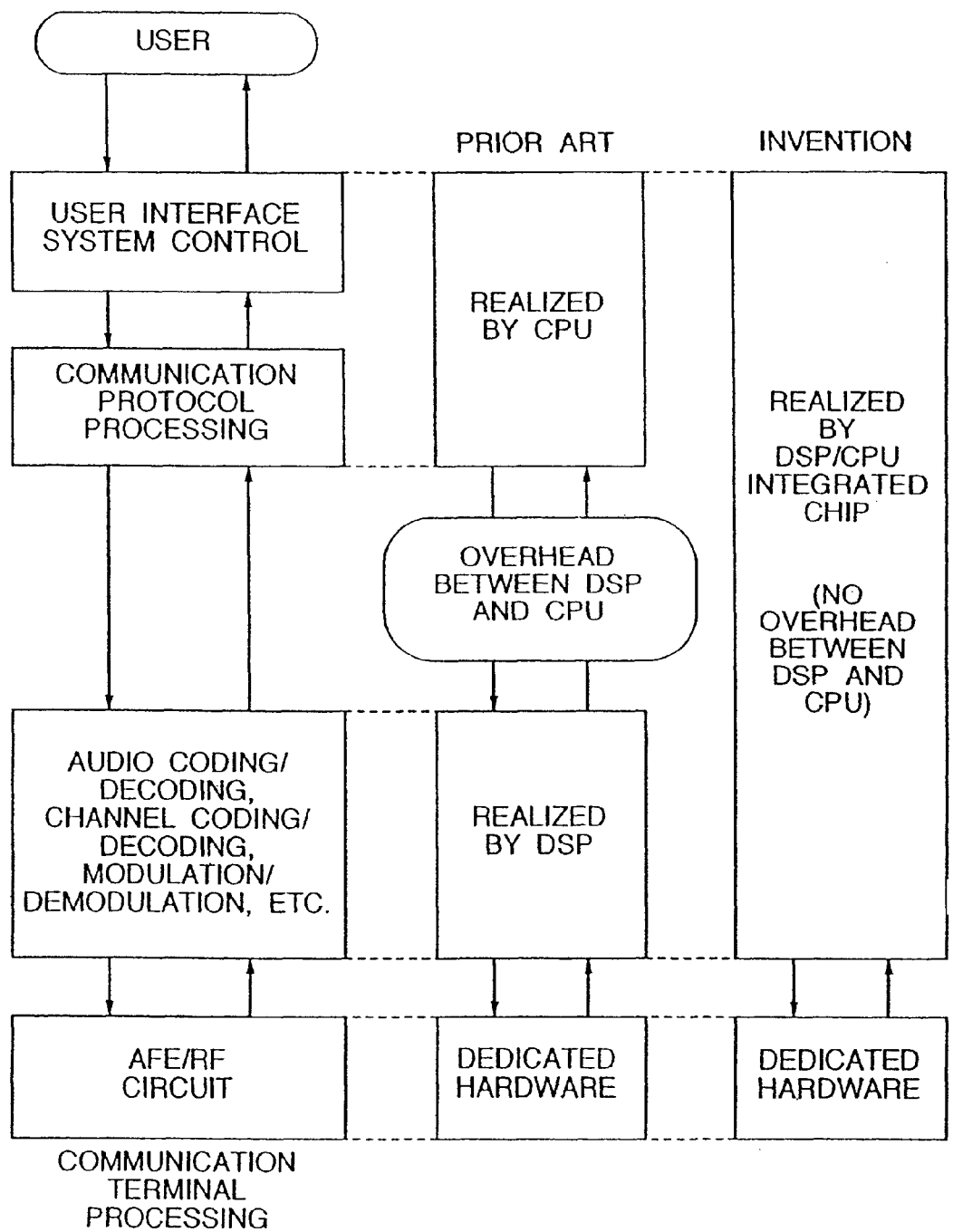
FIG. 18 is a diagram showing an overhead at a conventional GSM mobile communication terminal using a DSP and a CPU.

FIG. 18 shows how this process is realized by the invention and by the prior art. In the prior art using two independent DSP and CPU, the user interface process, system control and the communication protocol process are realized by a CPU chip, while the audio coding/decoding, the communication path coding/decoding process and the modulation/demodulation process are realized by a DSP chip. An exchange of data with the base station requires the communication path coding/encoding and the modulation/demodulation process requires realized by the DSP chip. This in turn makes it necessary to exchange the data on the communication protocol process with the base station. As a result, the CPU chip is required to communicate with the DSP chip. This communication overhead is illustrated with reference to the prior art in FIG. 18.

When the output of the power amplifier of the RF section is controlled, on the other hand, the D/A converter 203 for controlling the power amplifier PA in FIG. 2 is required to be accessed. Since the D/A converter 203 for controlling the PA is physically connected to the DSP chip, however, the CPU chip is required to communicate with the DSP chip whenever necessary.

According to this invention, by contrast, all the digital processes including the user interface process, the system control, the communication protocol process, the audio coding/decoding process, the communication path coding/decoding process and the modulation/demodulation process are realized by a DSP/CPU integrated chip. As shown in FIG. 18, therefore, the CPU chip has no overhead with the DSP chip and the system can be efficiently configured.

The overhead will be explained in detail with reference to FIGS. 20A, 20B. The mobile communication terminal shown in FIGS. 5 and 2 is first supplied with the instruction data for the power amplifier output control of the RF section from the base station.

In the prior art shown in FIG. 20A, this receiving data are sent to the DSP chip. FIG. 20A shows the subsequent processes in a flowchart.

First, the DSP chip performs the demodulation process and the channel decoding process for the receiving data. Then, the CPU chip is interrupted by the DSP chip to deliver the data sent thereto to the protocol process. The CPU chip thus interrupted suspends the program under execution, saves the internal status, and receives the receiving data from the DSP chip. After that, the CPU chip executes the protocol processing program to decode the receiving data, and coming to know that it is an instruction for power amplifier output control, outputs the control data. The CPU chip interrupts the DSP chip in order to access the power amplifier PA control D/A converter connected to the DSP chip. The DSP chip thus interrupted suspends the program in execution, saves the internal condition, and receives from the CPU chip an instruction and control data for driving the PA control D/A converter. The DSP chip thus drives the DSP peripheral circuit for analog front end AFE having the PA control D/A converter built therein, thereby controlling the power amplifier output. The processing flow of the prior art is described above. The overhead portion is shadowed.

Such the need of an overhead is completely eliminated according to the present invention using the DSP/CPU integrated chip shown in the flowchart of FIG. 20B. This is due to the fact that the integration of the DSP function and the CPU function eliminates the requirement for the communication between the DSP process and the CPU process and that the integrated peripheral circuits of the DSP and CPU permits the DSP peripheral circuit to be directly accessed by the CPU function.

Now, explanation will be made in detail about the direct access made by the CPU function to the DSP peripheral circuit with reference to FIGS. 17A, 19. In other words, the explanation refers to the case in which the protocol processing program executed by the CPU accesses directly the D/A converter for controlling the power amplifier PA.

Figure 17A:
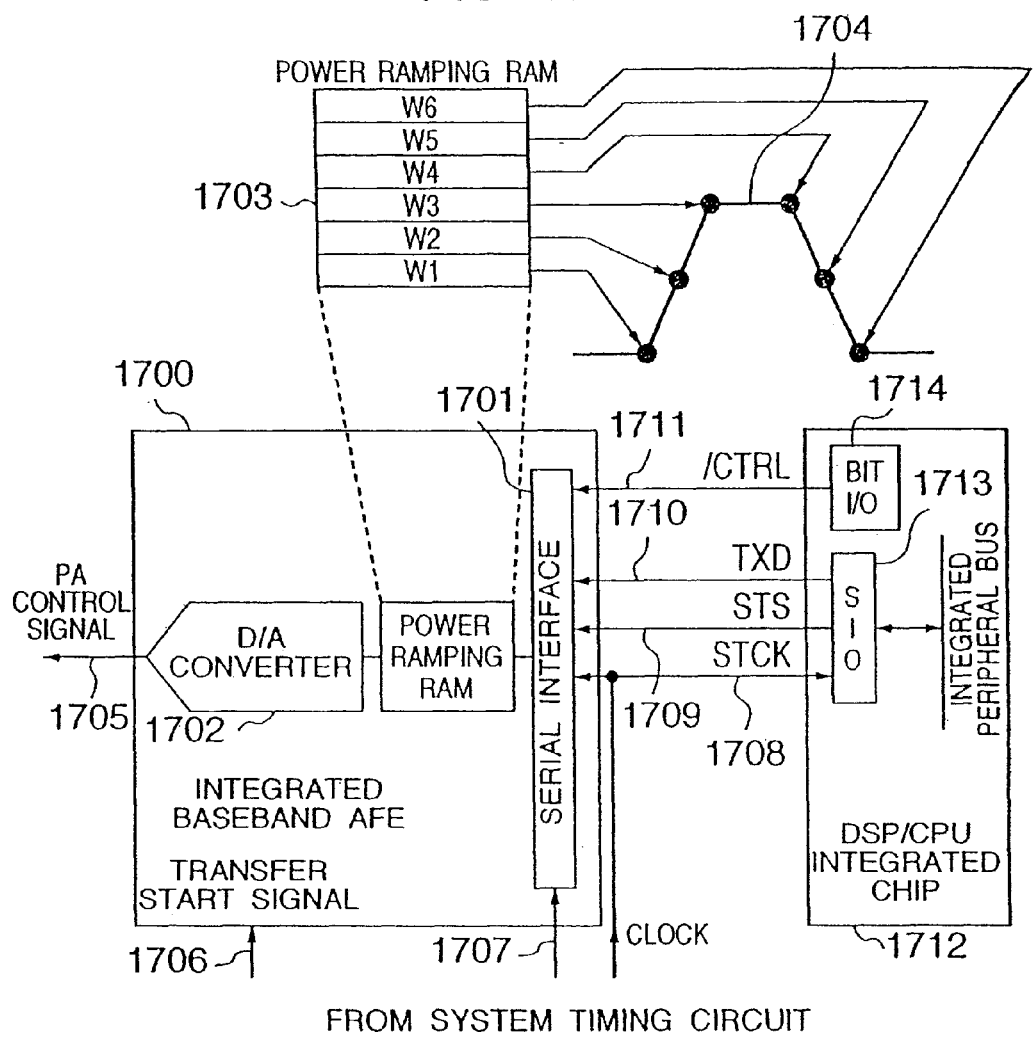
FIGS. 17A, 17B are a connection diagram and a time chart, respectively, for a DSP/CPU integrated chip and a power amplifier control D/A converter according to an eighth embodiment of the invention.

FIG. 17A shows, in enlarged form, only the related part of the joint between the DSP/CPU integrated chip 500 and the power amplifier PA control D/A converter 504 of a communication terminal. A serial input-output circuit SIO 1713, a BIT I/O circuit 1714 and an integrated peripheral bus are involved in the DSP/CPU integrated chip 1712. The component elements of an integrated baseband AFE 1700 relating to this embodiment include a serial interface 1701, a power ramping RAM 1703 and a PA control signal D/A converter 1702. The power ramping RAM 1703 has an output waveform built therein as a sample data. FIG. 17A shows the case of six samples. Any number of samples, however, can of course be employed. An example waveform 1704 formed by the six built-in data is also shown in FIG. 15A. The integrated baseband AFE 1700 controls the power amplifier by a PA control signal which is an analog signal. The output waveform built in the power ramping RAM 1703 is converted into an analog signal and output as a PA control signal 1705 at a timing designated by a transfer start signal 1706.

Figure 19:
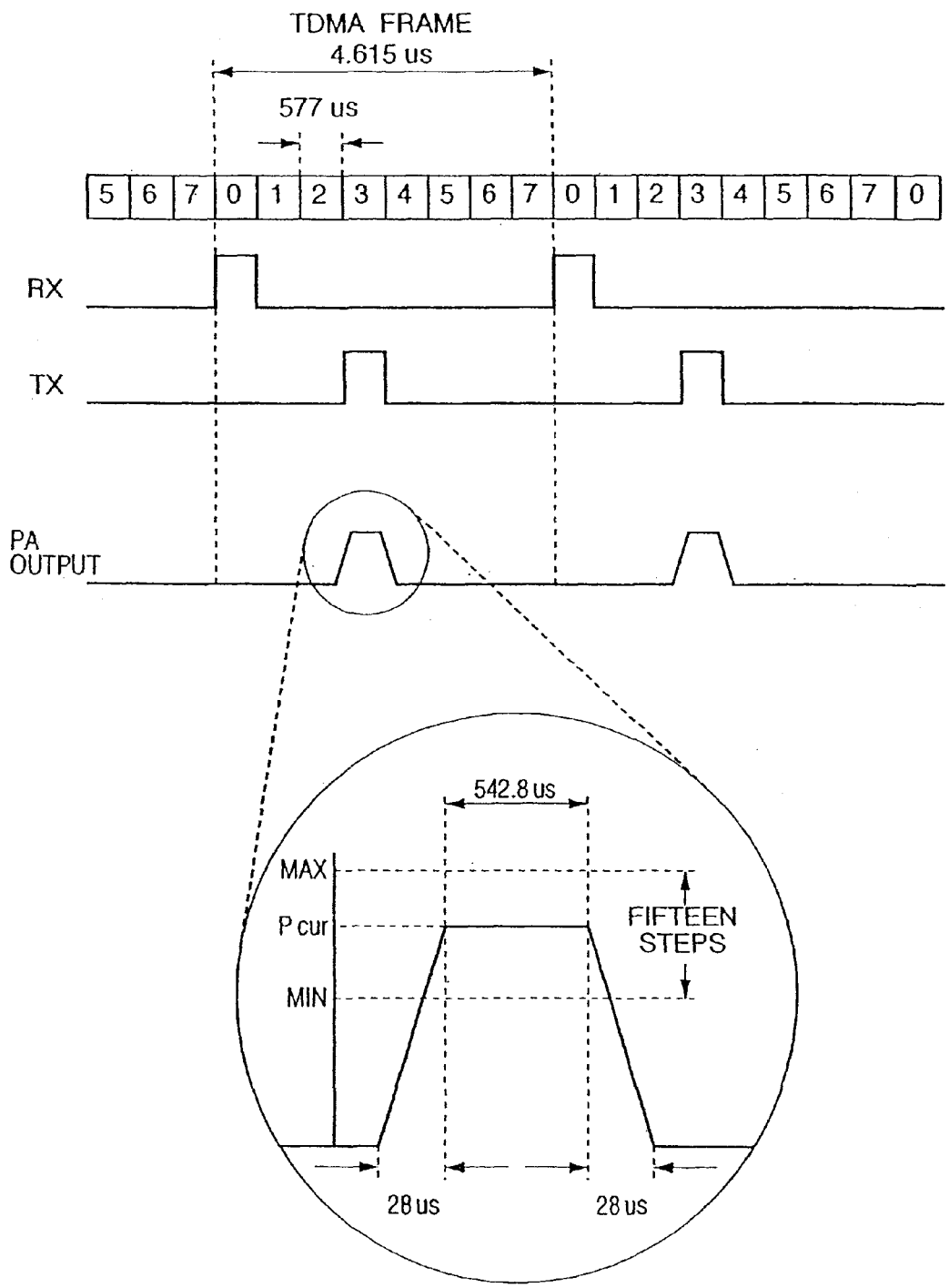
FIG. 19 is a diagram showing timings and output waveforms for controlling the power amplifier in a GSM mobile communication system.

FIG. 19 shows the timing designated by the transfer start signal 1706 and required waveforms of the power amplifier. The GSM communication system is a time-division system including eight time slots (577 μm) for each frame (4.615 ms). The transmission is activated during one time slot in one frame (8 time slots). Thus the timing indicated by Tx represents the timing designated by the transfer start signal 1706 in FIG. 17A. Character Rx in FIG. 19 shows the receiving timing. A required output waveform of the power amplifier is shown in the lower part of FIG. 19. As shown in FIG. 19, the GSM communication system severely restricts the ramping of rise and fall as well as the amplitude of the output waveform. The power ramping RAM 1703 of FIG. 17A is used for satisfying this requirement.

Figure 17B:
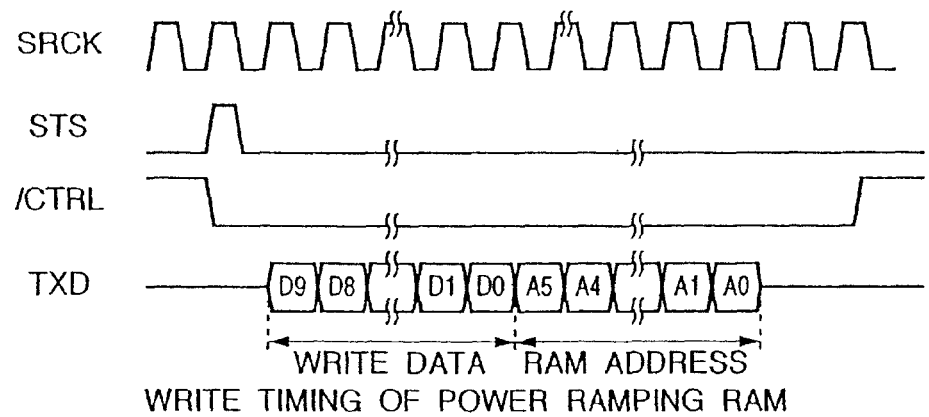

Turning to FIG. 17A, the explanation will be continued. The DSP/CPU integrated chip 1712 and the integrated baseband AFE 1700 are connected to each other through signal lines (TXD) 1710, (STS) 1709, (STCK) 1708 and (/CTRL) 1711. The timing chart for these signal lines is shown in FIG. 17B. The signals 1708, 1707 and 1706 in FIG. 7A are supplied from the system timing circuit 520 of FIG. 5. The signal line 1707 is used for controlling the serial interface 1701. The signal line 1708 represents a basic clock for data transfer and is supplied to both the DSP/CPU integrated chip 1712 and the integrated baseband AFE 1700.

Now, the operation of writing data in the power ramping RAM 1703 will be explained in detail. The basic operation of transferring data from the DSP/CPU integrated chip 1712 to the integrated baseband AFE 1700 is substantially the same as that explained with reference to FIGS. 13A, 13B, 15A, 15B. The difference lies, however, in that an address is required for designating one of the six entries to be written of the power ramping RAM 1703. For this purpose, the system of FIG. 17A uses a format in which the first 10 bits of the 16 bits in the transfer data represent data and the last six bits an address. These specific bit lengths of course are set provisionally for facilitating the understanding, and any number of bits may actually be used. Four signal lines (TXD) 1710, (STS) 1709, (STCK) 1708 and (/CTRL) 1711 are used for transfer. The signal line (STCK) 1708, as described above, represents a basic clock for data transfer supplied from the system timing circuit 520 of FIG. 5. In the case under consideration, 16-bit digital data are transferred bit by bit in synchronism with this basic clock. Alternatively, data of an arbitrary bit width can of course be transferred in the same manner. The signal line (TXD) 1710 is a 1-bit data bus for transmission. The signal line (STS) 1709 is a frame sync signal line. During the 16-clock period from the clock immediately following the pulse output of this signal, the data are output sequentially bit by bit onto the signal line (TXD) 1710.

The timing of this operation is shown in the lower part of FIG. 17B. The 10-bit data D9 to D0 and the 6-bit address A5 to A0 are sequentially output starting with the most significant bit D9 at the rate of a bit per clock in succession onto the signal line (TXD) 1710. In order to distinguish from the normal transfer mode described with reference to FIGS. 13A, 13B, 15A, 15B, the signal (/CTRL) 1711 is used. When the signal (/CTRL) 1711 is active, the 10-bit data are written in the internal resource of the integrated baseband AFE 1700 designated by the 6-bit address. In the case where data are written in the six entries of the power ramping RAM 1703, six 16-bit data having six corresponding addresses and data are transferred as required.

As described above, the power amplifier control involves none of the processes requiring the DSP function such as the Multiply and Accumulate calculation. In spite of this, the DSP chip is interrupted simply for accessing the DSP peripheral circuit in the prior art. According to the present invention, such a wasteful overhead does not occur since the CPU function can directly access the DSP peripheral circuit.

Ninth Embodiment

ASIC Circuit

Now, a ninth embodiment of the invention will be explained with reference to FIGS. 5 and 21. The ninth embodiment refers to the case in which a high-speed dedicated circuit is added to the DSP/CPU integrated chip on which the first embodiment is based.

The foregoing embodiments are assumed on a standard general-purpose DSP/CPU integrated circuit. If a system is to be efficiently realized to suit each specific application, however, a high-speed dedicated circuit ASIC (application specific integrated circuit) is required to be incorporated. Explanation will be made about how to configure such a circuit within the framework of the invention. A possible example of the ASIC circuit includes an A/D converter, a D/A converter and a serial interface circuit in the integrated AFE 501 of FIG. 5.

Figure 21:
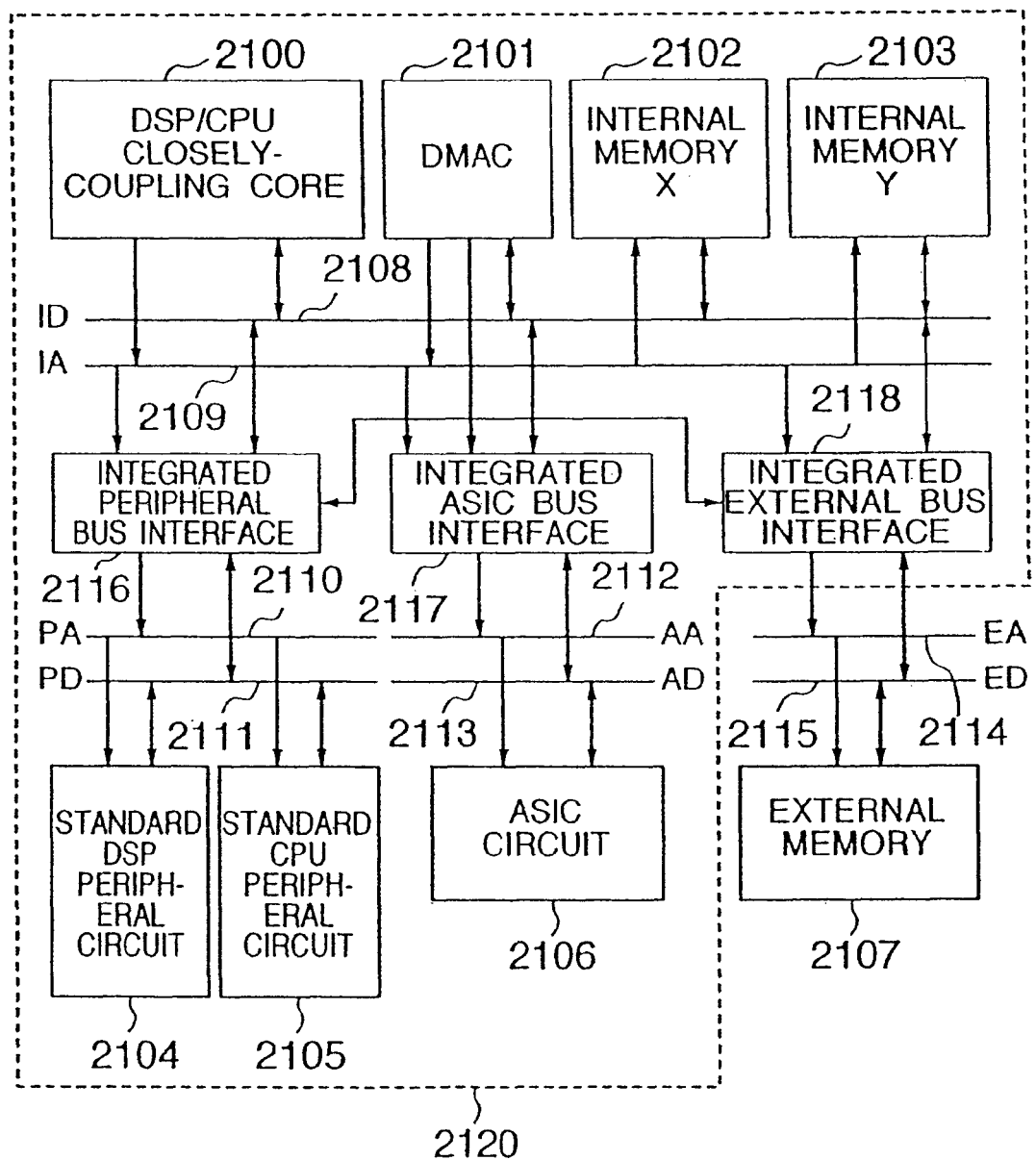
FIG. 21 is a diagram showing a configuration of a DSP/CPU integrated chip having an integrated ASIC bus interface according to a ninth embodiment of the invention.

FIG. 21 shows the portions of the DSP/CPU integrated chip relating to the present embodiment, an external memory and an external bus. The configuration of FIG. 21 includes a DSP/CPU closely-coupling core 2100, an internal memory X 2101, an internal memory Y 2103, an integrated peripheral bus interface 2116, a DMAC 2101, an integrated external bus interface 2118, an integrated ASIC bus interface 2117, a standard DSP peripheral circuit 2104, a standard CPU peripheral circuit 2105 and an ASIC circuit 2106. The DSP/CPU closely-coupling core 2100, the DMAC 2101, the internal memory X 2101, the internal memory Y 2103, the integrated peripheral bus interface 2116, the integrated ASIC bus interface 2117 and the integrated external bus interface 2118 are connected to each other through the internal address bus 2109 and the internal data bus 2108. The standard DSP peripheral circuit 2104 and the standard CPU peripheral circuit 2105 are connected to the integrated peripheral bus interface 2116 through the address bus PA 2110 and the data bus PD 2111.

The ASIC circuit 2106 is connected to the integrated ASIC bus interface 2117 through an address bus (AA) 2112 and a data bus (AD) 2113. The external memory 2107 is connected to the integrated external bus interface 2116 through an address bus (EA) 2114 and a data bus (ED) 2115. In the configuration of FIG. 21, the integrated ASIC bus interface 2117 is connected to the internal bus in parallel with the integrated peripheral bus interface 2116. The integrated ASIC bus interface 2117 is not required to accommodate the various peripheral circuits but can be realized with a simple, high-speed structure. The ASIC circuit 2106 may be directly coupled to the internal bus in some cases.

As described above, a high-speed exclusive circuit can be incorporated by preparing a high-speed, simple integrated ASIC bus interface independent of the standard integrated peripheral bus interface. A system suitable for a specific application can thus be efficiently realized.

10th Embodiment

Finally, a tenth embodiment of the invention will be explained with reference to FIGS. 3, 22, 23 and 24. This embodiment refers to a method of preparing a compiler for delivering data from a high-level language such as the C language executed by the CPU function efficiently to the assembler program executed by the DSP function in a DSP/CPU integrated chip.

FIG. 3 shows an internal structure of a DSP/CPU closely-coupling core on which the invention is based. As described above, the CPU core 307 and the DSP engine 306 operate concurrently at the time of executing the DSP function. More specifically, the CPU core 307 functions as an addressing unit of the DSP engine 306.

Figure 22:
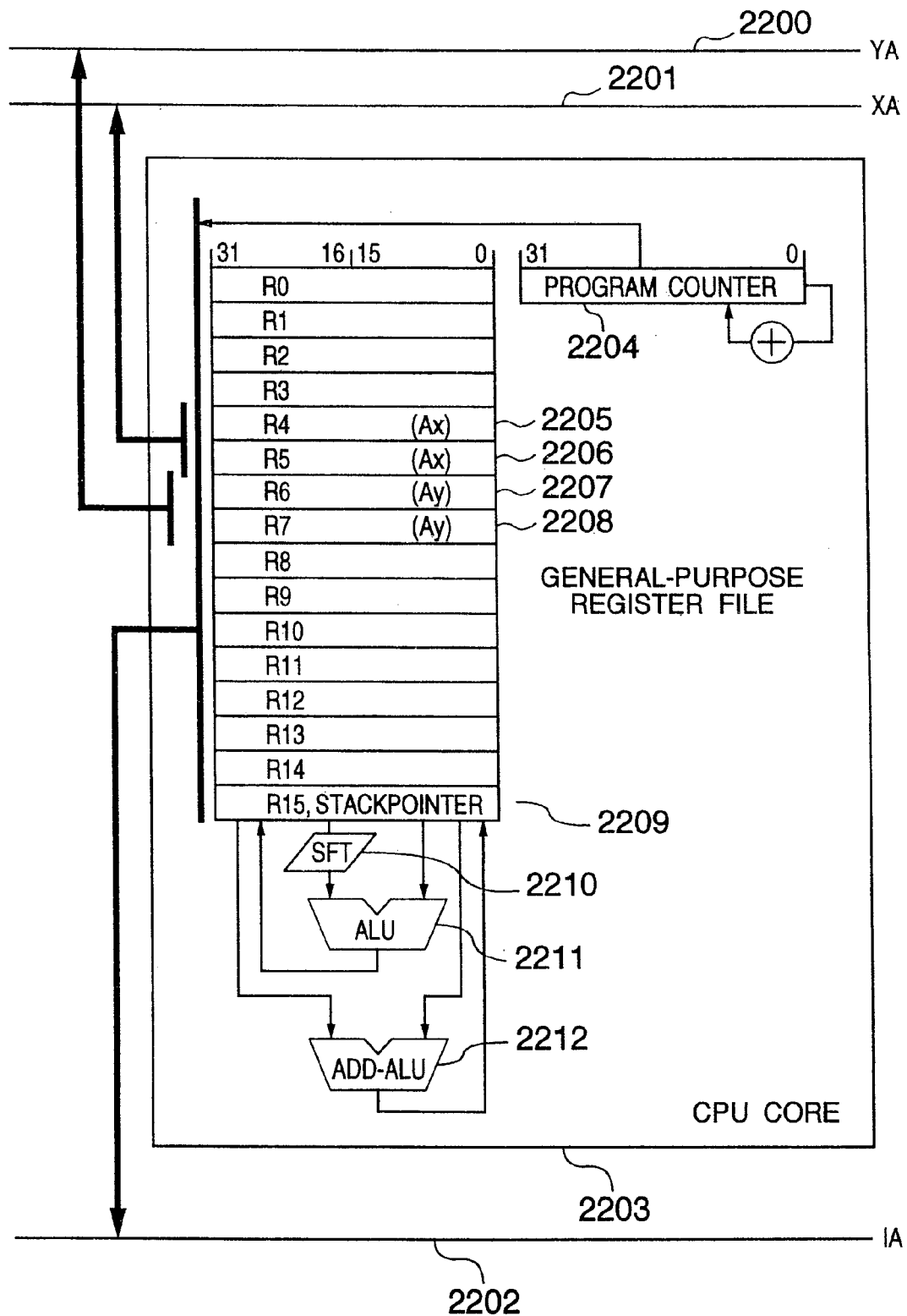
FIG. 22 is a diagram showing a configuration of a CPU in a DSP/CPU integrated chip.

FIG. 22 shows, in enlarged form, the portion of the CPU core 307 of FIG. 3 related to the present embodiment. The components shown in FIG. 22 include a CPU core 2203, three internal address buses (IA) 2202, (XA) 2201 and (YA) 2200. FIG. 22 also shows 16 registers 2209 (R0 to R15), a shifter (SFT) 2210, an ALU 2211, an add-ALU (auxiliary ALU) 2112 and a program counter 2204 in the CPU core 2203. At the time of executing the DSP function, the four registers R4, R5, R6, R7 of the 16 registers 2209 are used for data access through the internal address buses (KA) 2201 and (YA) 2200. The registers R4 and R5 are connected to the address bus (XA) 2201, while R6 and R7 are connected to the address bus (YA) 2200.

The manner in which the this CPU core functions as an address operator of the DSP engine will be explained with reference to FIG. 24. For facilitating the explanation of the DSP function, a simple Multiply and Accumulate calculation will be taken as an example. An assembler expression 2400 of the Multiply and Accumulate calculation realized by the DSP function is shown in the upper part of FIG. 24. The hardware in the DSP/CPU integrated chip used at this time is shown in the central portion of FIG. 24. The hardware includes an XMEM (internal memory X) 2413, a YMEM (internal memory Y) 2412, four CPU core registers (R4) 2415, (R5) 2414, (R6) 2411 and (R7) 2410, four registers (X0) 2416, (Y0) 2409, (MO) 2407 and (A0) 2405 for the DSP engine, a multiplier 2408 for the DSP engine and an ALU 2406 for the DSP engine.

Four arrows 2401, 2402, 2403, 2404 indicate the hardware related to the assembler expression 2400 of the Multiply and Accumulate calculation. The assembler expression 2400 is divided into four portions for designating the concurrent operation corresponding to the four arrows 2401, 2402, 2403, 2404, respectively. The first portion designates the addition of the contents of the register (AO) 2405 and the content of the register (MO) 2407, and the sum is stored in the register (MO) 2405. The second portion designates multiplication of the contents of the register (XO) 2416 and the resistor (YO) 2409, and the product is stored in the register (MO) 2407. The third portion designates the reading of data from the internal memory X, in which the XMEM (internal memory X) 2413 is accessed with the content of R5 as an address, and the data thus read are stored in the register (XO). The fourth portion designates the reading of data from the internal memory Y, in which the YMEM (internal memory Y) 2412 is accessed with the content of the register (R6) as an address, and the data thus read out is stored in the resistor (YO).

As described above, according to this embodiment, four CPU core registers (R4) 2415, (R5) 2414, (R6) 2411 and (R7) 2410 are used as an address pointer for the DSP engine. Especially, the registers (R4) 2415 and (R5) 2414 are used as a pointer for the internal memory X, and the registers (R6) 2411 and (R7) 240 as a pointer for the internal memory Y, for concurrent access.

Figure 23:
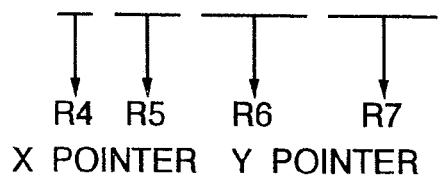
FIG. 23 is a diagram showing an example of the C program for explaining a tenth embodiment of the invention.
Figure 24:
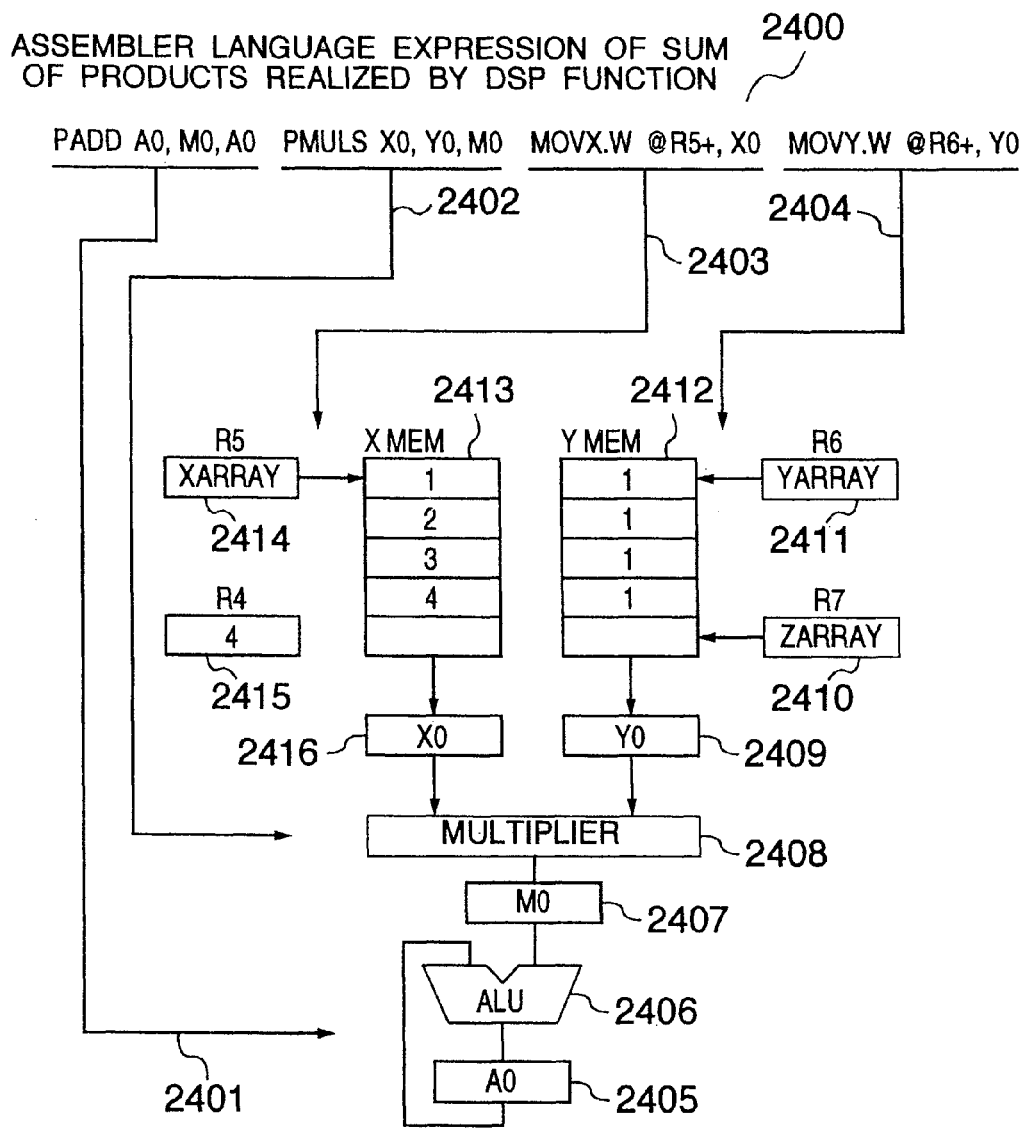
FIG. 24 is a diagram showing hardware related to an assembler program for explaining the tenth embodiment of the invention.

Now, let us consider the manner in which the assembler program shown in FIG. 24 is called from the C language with reference to FIG. 23. In FIG. 23, this assembler program is called by the name of mac-sss. The program of FIG. 23 is so simple that the Multiply and Accumulate is taken for two arrangements of four elements. In the DSP program including this example, the leading address of the arrangement on which execution of the Multiply and Accumulate is desired is naturally delivered as an argument. As a way of delivering the argument to the compiler, the first four arguments of a function are effectively assigned to the four CPU core registers used as address pointers of the DSP engine. It follows, therefore, that in the example of FIG. 23, the leading addresses of the two arrays for which the Multiply and Accumulate is taken are delivered to the registers R5 and R6. As seen from FIG. 24, the registers R5 and R6 can be immediately used for concurrent access to the memory as X and Y pointers respectively, thereby leading to a high efficiency.

The assembler program that has received the argument can thus efficiently execute the DSP function by the above-mentioned method of register assignment for a high-level language compiler, in which the first four arguments of a function are assigned to four CPU core registers used as address pointers of the DSP engine.

The invention developed by the present inventors has been specifically explained above on the basis of embodiments. The present invention, however, is not limited to such embodiments, but various modifications thereof are of course available without departing from the scope and spirit of the invention. Also, the embodiments can be combined or replaced with one another.

INDUSTRIAL APPLICABILITY

The effects of the representative aspects of the present invention disclosed in this patent application will be explained briefly below.

Specifically, the advantage is that the memory systems and the peripheral circuits of the DSP function and the CPU function are integrated thereby to realize a mobile communication terminal system low in cost and power consumption and small in size.

Also, the versatility of distributing common internal and external memories arbitrarily between the DSP and CPU functions permits efficient use of the memories incorporated in the system.

Further, an extraneous overhead is eliminated from the communication between the DSP function and the CPU function, and therefore a mobile communication terminal system can be efficiently configured.

What is claimed is:

1. A mobile communications terminal comprising:
A microprocessor including registers and an internal memory;
an external memory coupled with the microprocessor;
an antenna configured to receive reception data from outside of the mobile communication terminal and to transmit data to outside of the mobile communication terminal;
a duplexer configured to separate an input radio wave of the reception data from an output radio wave of the transmit data, and coupled to the antenna,
a low-noise amplifier configured to input the reception data via the duplexer, and
an RF circuit configured to convert a frequency of the reception data input through the low-noise amplifier and the transmission data, wherein the internal memory includes a first internal memory and a second internal memory,
wherein the microprocessor is formed on a single chip semiconductor, and includes a CPU and a DSP,
wherein the CPU includes a part of the registers, and the DSP includes a part of the registers,
wherein the RF circuit is configured to convert the reception data from the low-noise amplifier into a low-frequency baseband analog signals,
wherein the reception data converted into the low-frequency is converted into digital data, and are provided to the DSP of the microprocessor,
wherein the DSP of the microprocessor is configured to decode the reception data of digital data, wherein the DSP of the microprocessor is configured to encode the transmit data,
wherein the transmit data encoded by the DSP of the microprocessor is converted into analog data,
wherein the transmit data of analog data is over an RF frequency by the RF circuit, and the transmit data from the RF circuit is provided the duplexer via a power amp,
wherein the microprocessor is operable to receive data from the internal memory to one of the registers for the CPU,
wherein the microprocessor is configured to receive data from the first and second internal memories to the registers for the DSP in parallel during encoding or decoding by the DSP,
wherein the microprocessor includes an external memory interface which provides a RAS signal and a CAS signal to the external memory for controlling the external memory, and
wherein the external memory is operable to be accessed by the CPU and DSP via the external memory interface.

2. A mobile communication terminal according to claim 1, wherein the microprocessor further includes an interface circuit for providing a first data signal corresponding to the transmission data, and for receiving a second data signal corresponding to the receiving data.

3. A mobile communication terminal according to claim 2, wherein the interface circuit has a storing unit for storing the receiving data and the transmission data.

4. A mobile communication terminal according to claim 1, wherein the microprocessor is configured to output a first data signal corresponding to the transmission data to the antenna, and
wherein the microprocessor is operable to receive a second data signal corresponding to the reception data from the antenna.

5. A mobile communication terminal according to claim 1, wherein the microprocessor is operable to perform a FIR filter operation per one cycle by using the DSP.

6. A mobile communication according to claim 5, wherein the CPU includes an arithmetic logic unit, and
wherein the arithmetic logic unit is operable to perform an address operation for accessing to the internal memory by the CPU and the DSP.

7. A mobile communication terminal according to claim 1, wherein the external memory is operable to store a plurality of programs for using the DSP and the CPU.

8. A mobile communication terminal comprising:
a microprocessor formed on a single chip semiconductor, and including registers and an internal memory;
an external memory coupled to the microprocessor;
an antenna configured to receive a reception data from outside of the mobile communication terminal and to transmit transmission data to outside of the mobile communication terminal,
a duplexer configured to separate an input radio wave of the reception data from an output radio wave of the transmit data, and coupled to the antenna,
a LNA configured to input the reception data via the duplexer, and
an RF circuit configured to convert a frequency of the reception data via the LNA and the transmission data,
wherein the microprocessor includes a CPU, a DSP and an external memory interface,
wherein the CPU includes a part of the registers of the microprocessor,
wherein the DSP includes a part of the registers of the microprocessor,
wherein the RF circuit is configured to convert the reception data from the LNA into a low-frequency analog signals,
wherein the reception data converted into the low-frequency is converted into digital data, and are provided to the DSP of the microprocessor,
wherein the DSP of the microprocessor is configured to decode the reception data of digital data,
wherein the DSP of the microprocessor is configured to encode the transmit data,
wherein the transmit data encoded by the DSP is converted into analog data,
wherein the transmit data of analog data is over an RF frequency by the RF circuit, and outputted to outside via the antenna,
wherein the external memory interface provides a RAS signal, a CAS signal and address signals to the external memory for controlling the external memory is response to an access from the CPU or the DSP,
wherein the external memory is operable to provide data to the microprocessor based on the RAS signal and the CAS signal via the external memory interface, when the microprocessor operates a read access,
wherein the internal memory includes a first internal memory and a second internal memory, and
wherein the microprocessor is configured to receive data from the first and second internal memories to the registers of the DSP in parallel during encoding the transmit data or decoding the reception data.

9. A mobile communication terminal according to claim 8, wherein the registers includes registers of the CPU and registers of the DSP,
wherein the microprocessor is operable to transfer data from the internal memory to the registers of the CPU, and wherein the microprocessor is operable to transfer data from the memory to the registers of the DSP.

10. A mobile communication terminal according to claim 9,
wherein the DSP is configured to perform a FIR filter operation.

11. A mobile communication terminal according to claim 9,
wherein the microprocessor further has an arithmetic logic unit, and
wherein the arithmetic logic unit is operable to generate address signals for the DSP.

12. A mobile communication terminal according to claim 8,
wherein the microprocessor is configured to output a first data signal corresponding to the transmission data, to the antenna, and
wherein the microprocessor is configured to receive a second data signal corresponding to the reception data from the antenna.

13. A mobile communication terminal according to claim 8, wherein the external memory is operable to transfer data to the CPU and the DSP or receive data from the CPU and the DSP.

14. A mobile communication terminal according to claim 13,
wherein the CPU is operable to generate an address signal for the DSP, and
wherein the DSP is operable to access the external memory based on the address signal provided from the CPU.

15. A mobile communication terminal according to claim 8,
wherein the microprocessor further includes an interface circuit to provide a first data signal corresponding to the transmission data, and to receive a second data signal corresponding to the receiving data.

16. A mobile communication terminal according to claim 15,
wherein the interface circuit includes a storing unit to store the receiving data and the transmitting data.

* * * * *